(12) United States Patent
Maeda et al.

(10) Patent No.: US 10,955,243 B2
(45) Date of Patent: Mar. 23, 2021

(54) INERTIAL SENSOR

(71) Applicant: Hitachi Automotive Systems, Ltd., Hitachinaka (JP)

(72) Inventors: Daisuke Maeda, Tokyo (JP); Kazuo Ono, Tokyo (JP); Masahide Hayashi, Ibaraki (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 257 days.

(21) Appl. No.: 15/576,037

(22) PCT Filed: Apr. 26, 2016

(86) PCT No.: PCT/JP2016/063035
§ 371 (c)(1),
(2) Date: Nov. 21, 2017

(87) PCT Pub. No.: WO2016/194524
PCT Pub. Date: Dec. 8, 2016

(65) Prior Publication Data
US 2018/0156615 A1    Jun. 7, 2018

(30) Foreign Application Priority Data

May 29, 2015 (JP) .............................. JP2015-110442

(51) Int. Cl.
*G01C 19/5776*    (2012.01)
*G01C 21/16*    (2006.01)
*G01C 25/00*    (2006.01)

(52) U.S. Cl.
CPC ......... *G01C 19/5776* (2013.01); *G01C 21/16* (2013.01); *G01C 25/00* (2013.01)

(58) Field of Classification Search
CPC ..... G01C 19/5776; G01C 21/16; G01C 25/00
See application file for complete search history.

(56) References Cited

U.S. PATENT DOCUMENTS 9,557,345 B2    1/2017 Maeda et al.
2007/0010936 A1    1/2007 Nordmark et al.
(Continued)

FOREIGN PATENT DOCUMENTS

DE    10 2013 211 983 A1    1/2014
JP    6-191790 A    7/1994
(Continued)

OTHER PUBLICATIONS

Extended European Search Report issued in counterpart European Application No. 16802961.9 dated Feb. 1, 2019 (eight (8) pages).
(Continued)

*Primary Examiner* — John E Breene
*Assistant Examiner* — L. Anderson
(74) *Attorney, Agent, or Firm* — Crowell & Moring LLP

(57) ABSTRACT

In an inertial sensor that includes an angular rate detection circuit having a structure synchronized with a resonant frequency of an angular rate detection element, an object thereof is to realize an angle output having high accuracy with less integration error in an integration circuit for detecting an angle. The inertial sensor includes an angular rate detection element chip C1 that has a mechanical structure for angular rate detection; and a signal processing LSI chip C2 that is angular rate detection circuit for detecting an angular rate from the angular rate detection element chip C1. The signal processing LSI chip C2 calculates an angle by sampling a signal obtained from the angular rate detection element chip C1 at a discrete time synchronized with a drive frequency of the angular rate detection element chip C1.

9 Claims, 16 Drawing Sheets

(56) References Cited

U.S. PATENT DOCUMENTS

2010/0307243 A1   12/2010  Prandi et al.
2013/0173207 A1    7/2013  Tanenhaus
2016/0047675 A1*  2/2016  Tanenhaus ........... G01C 25/005
                                                                                  702/104

FOREIGN PATENT DOCUMENTS

| JP | 7-71964 A | 3/1995 |
|----|-----------|--------|
| JP | 2007333467 | * 12/2007 |
| JP | 2008-256381 A | 10/2008 |
| JP | 2011-47921 | 3/2011 |
| JP | 2011-64515 A | 3/2011 |
| WO | WO 00/36376 | 6/2000 |

OTHER PUBLICATIONS

Cover page of EP 1 147 373 A1 published Oct. 24, 2001 (one (1) page).

International Search Report (PCT/ISA/210) issued in PCT Application No. PCT/JP2016/063035 dated Jul. 19, 2016 with English translation (six (6) pages).

Japanese-language Written Opinion (PCT/ISA/237) issued in PCT Application No. PCT/JP2016/063035 dated Jul. 19, 2016 (four (4) pages).

Chinese-language Office Action issued in Chinese Application No. 201680022907.5 dated Aug. 18, 2020 with English translation (16 pages).

* cited by examiner

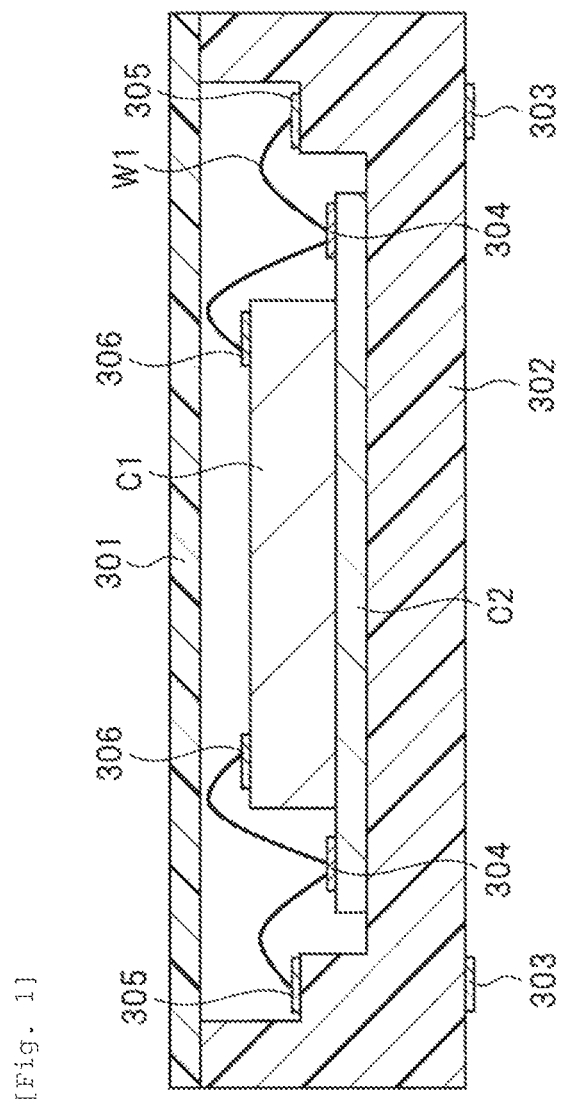
[Fig. 1]

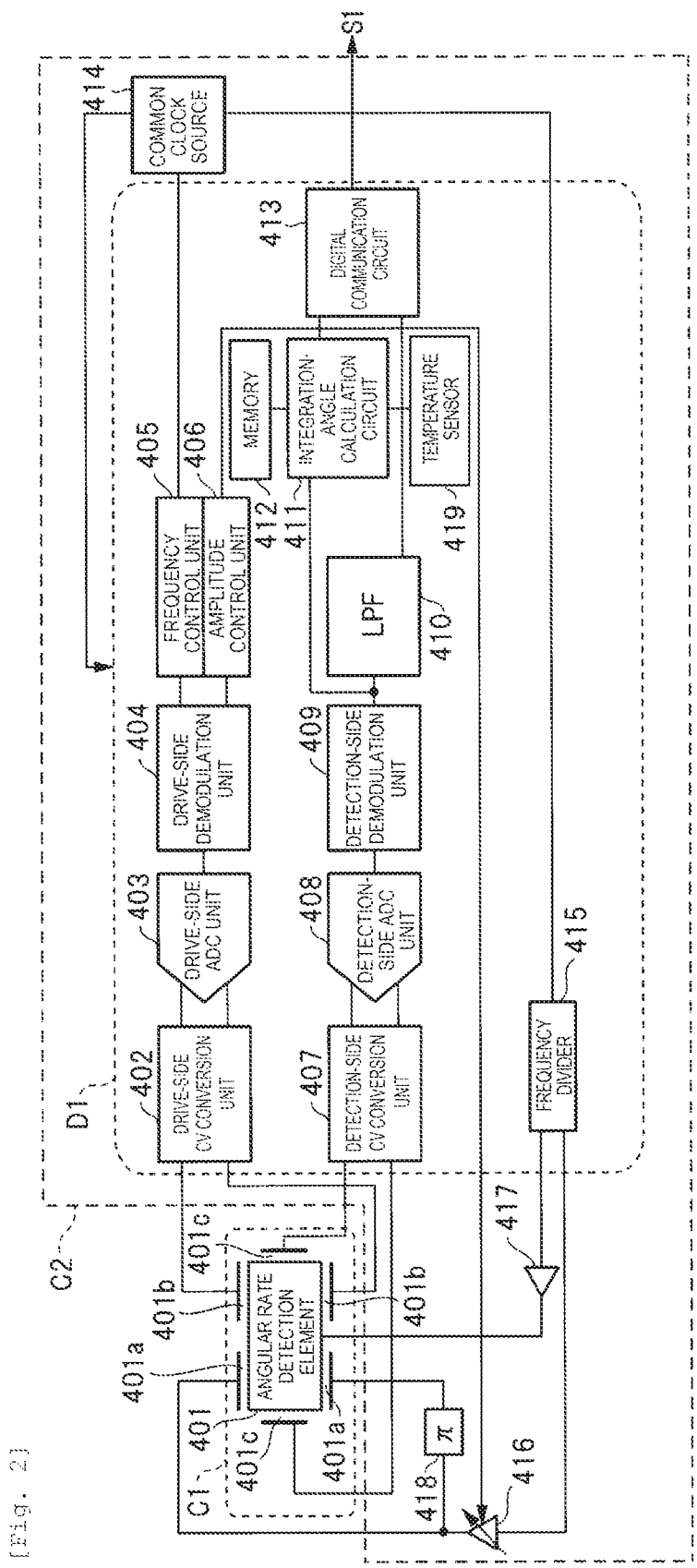
[Fig. 2]

[Fig. 3A]
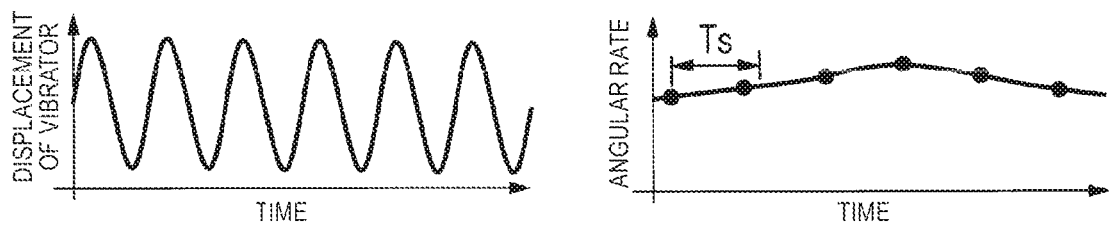
[Fig. 3B]
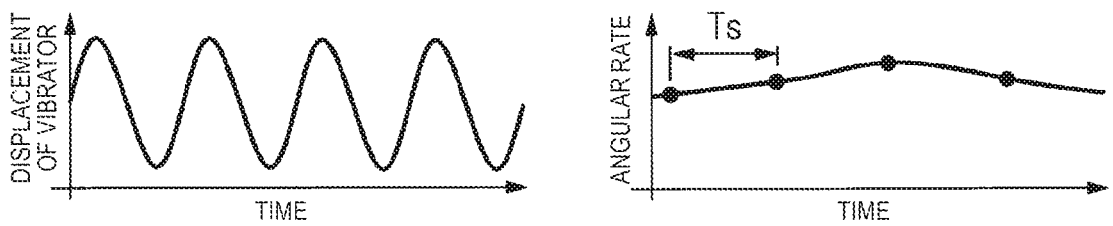
[Fig. 4]
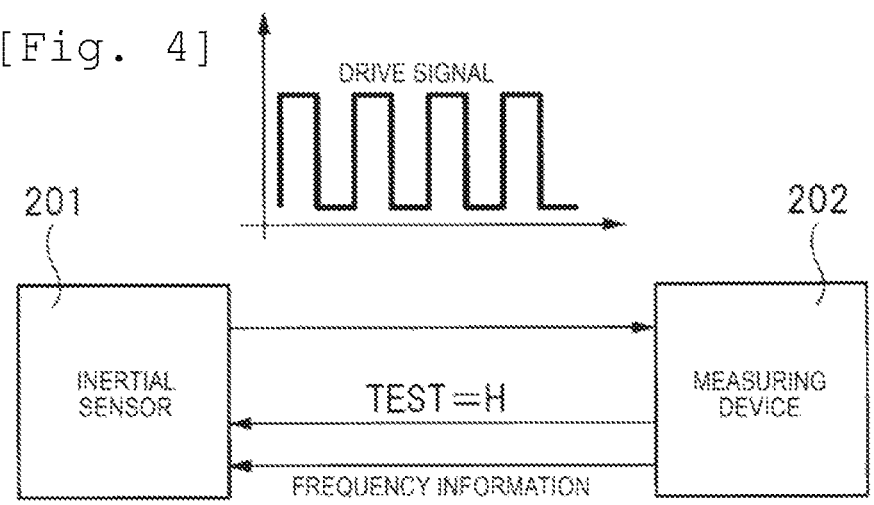

[Fig. 5]
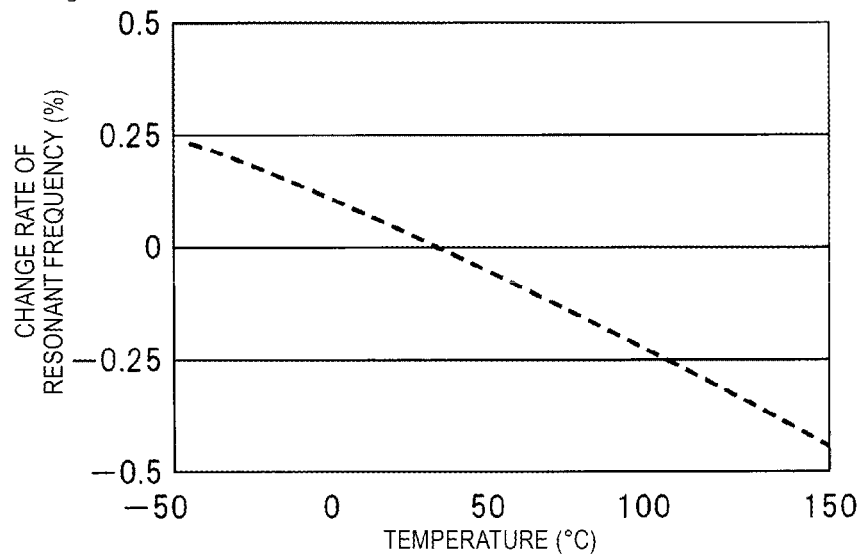
[Fig. 6]
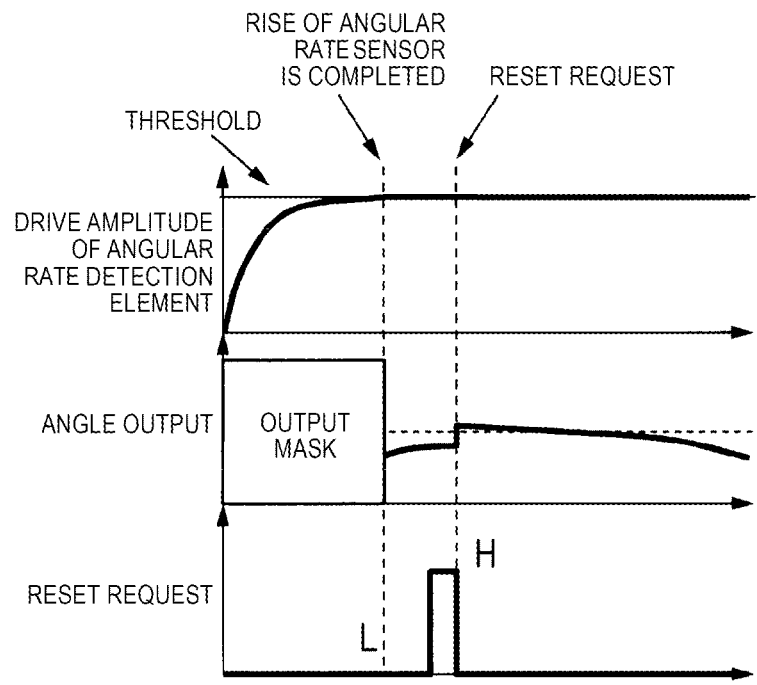

[Fig. 7]
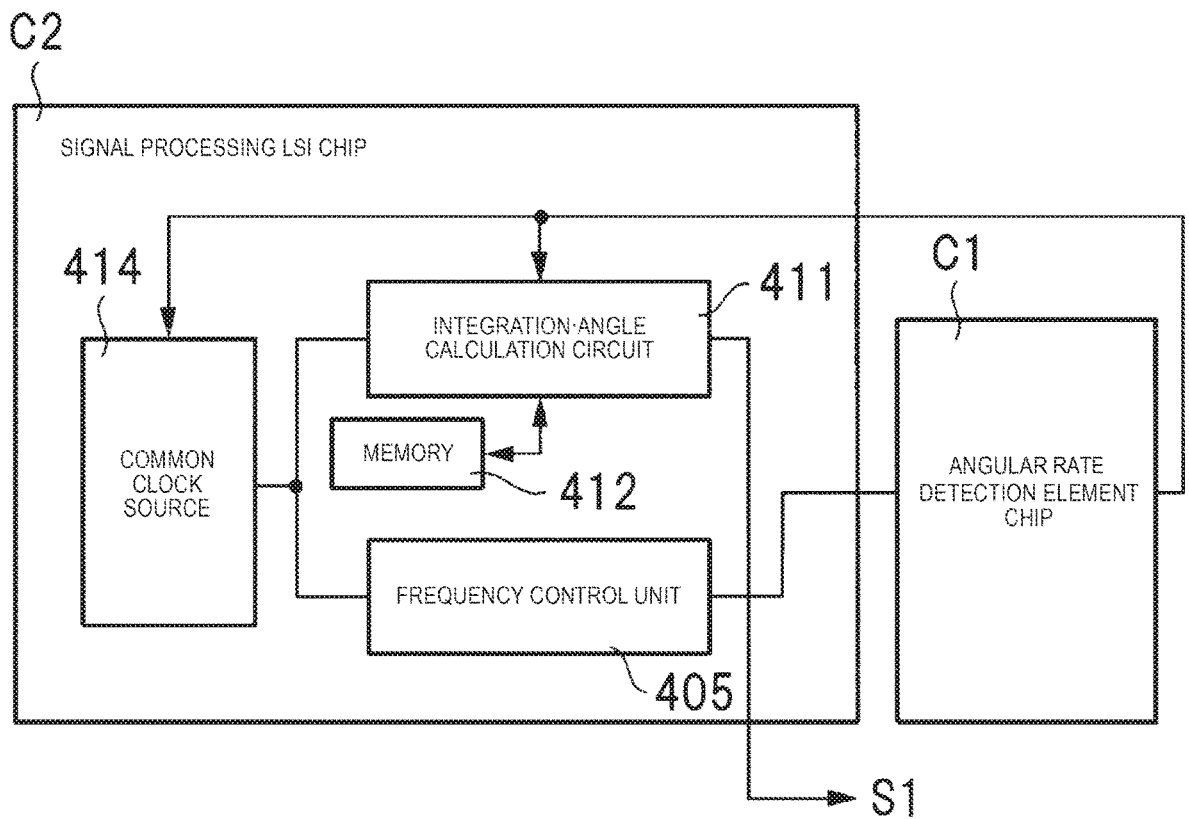

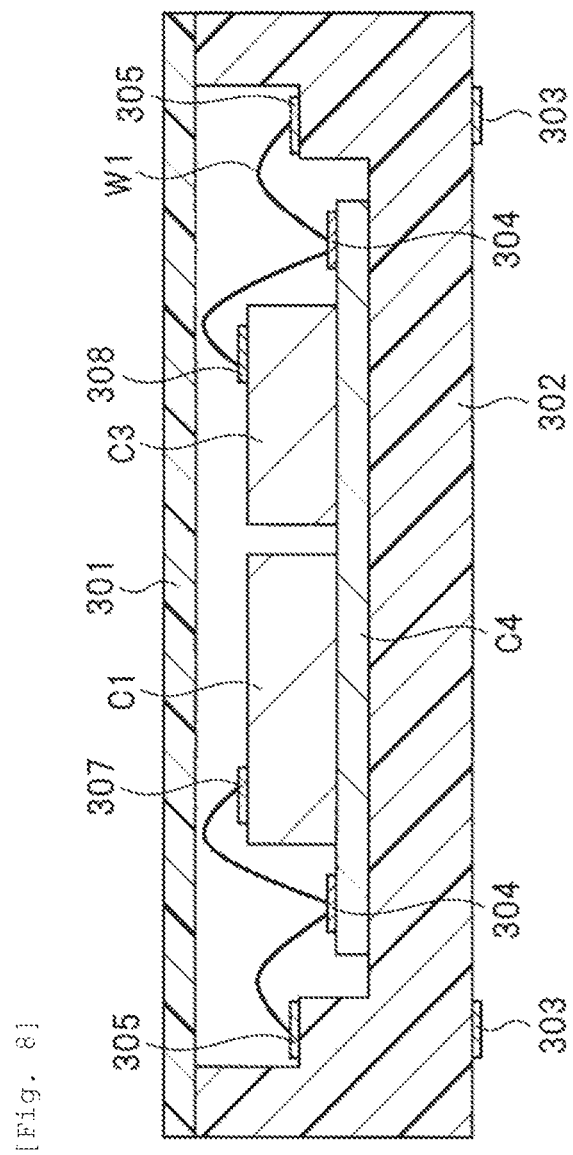
[Fig. 8]

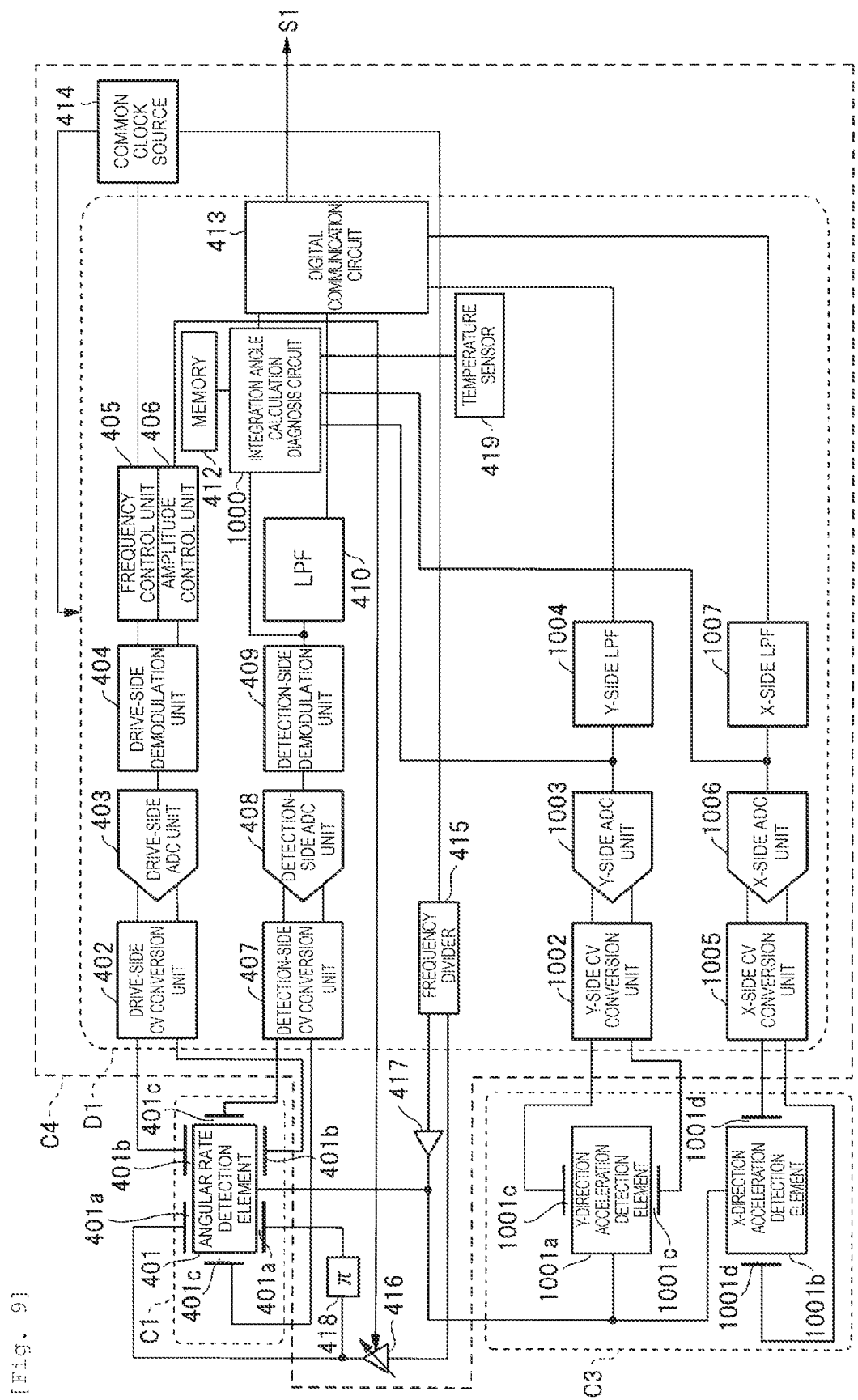
[Fig. 9]

[Fig. 10A]
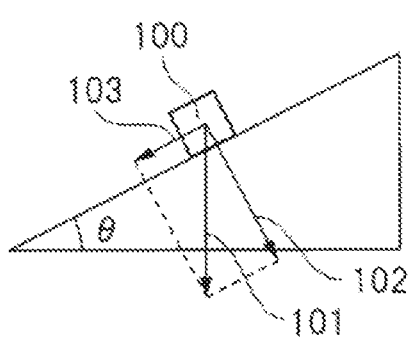
[Fig. 10B]
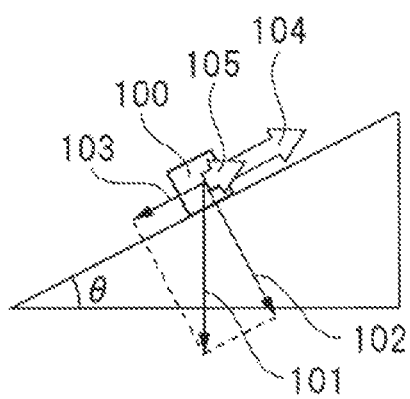

[Fig. 11]
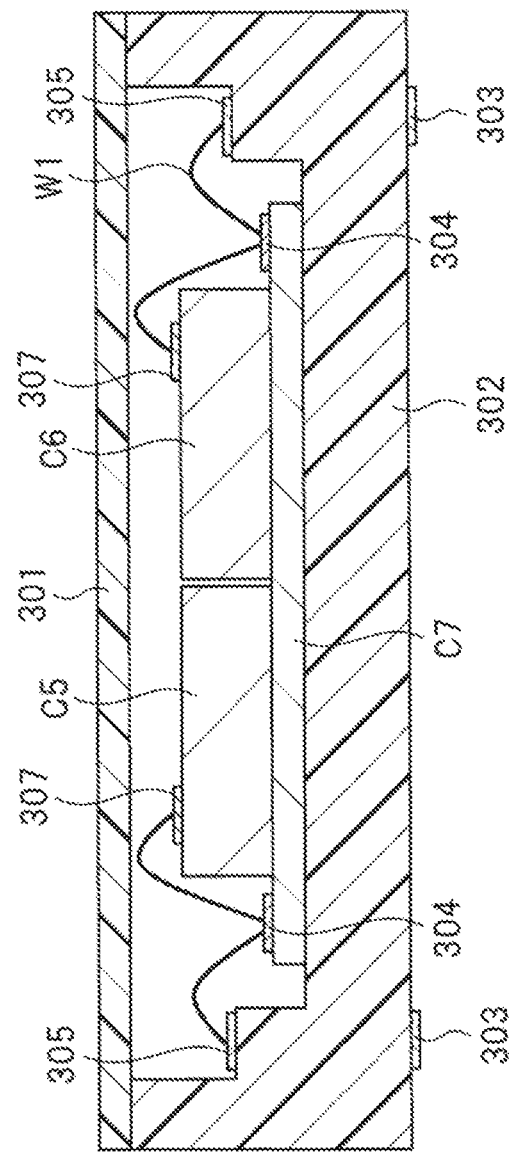

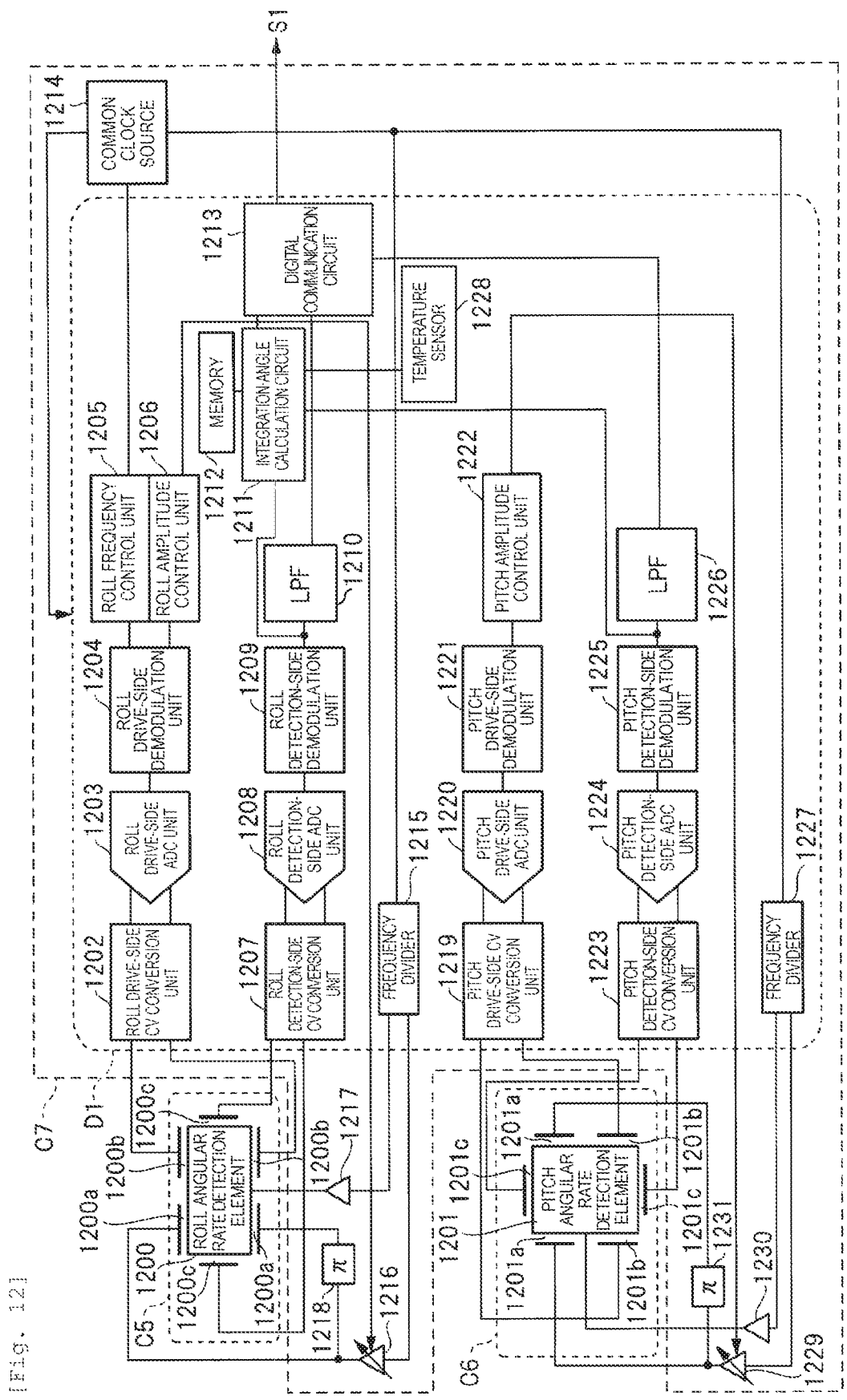
[Fig. 12]

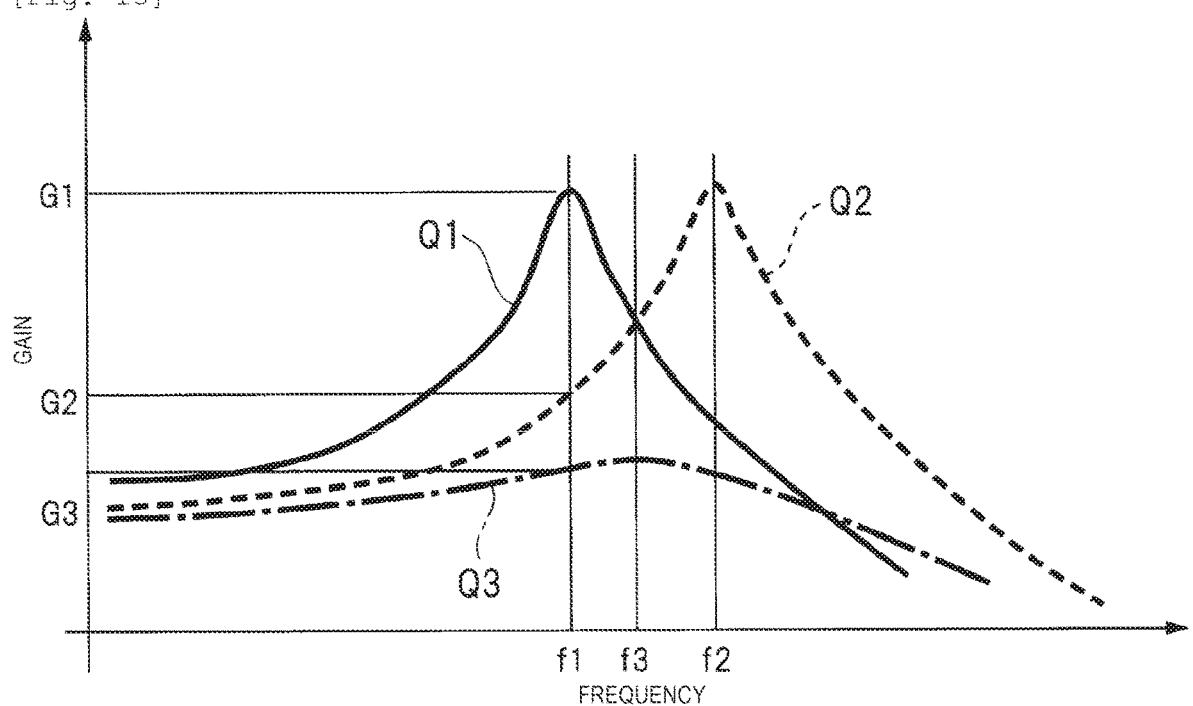
[Fig. 13]

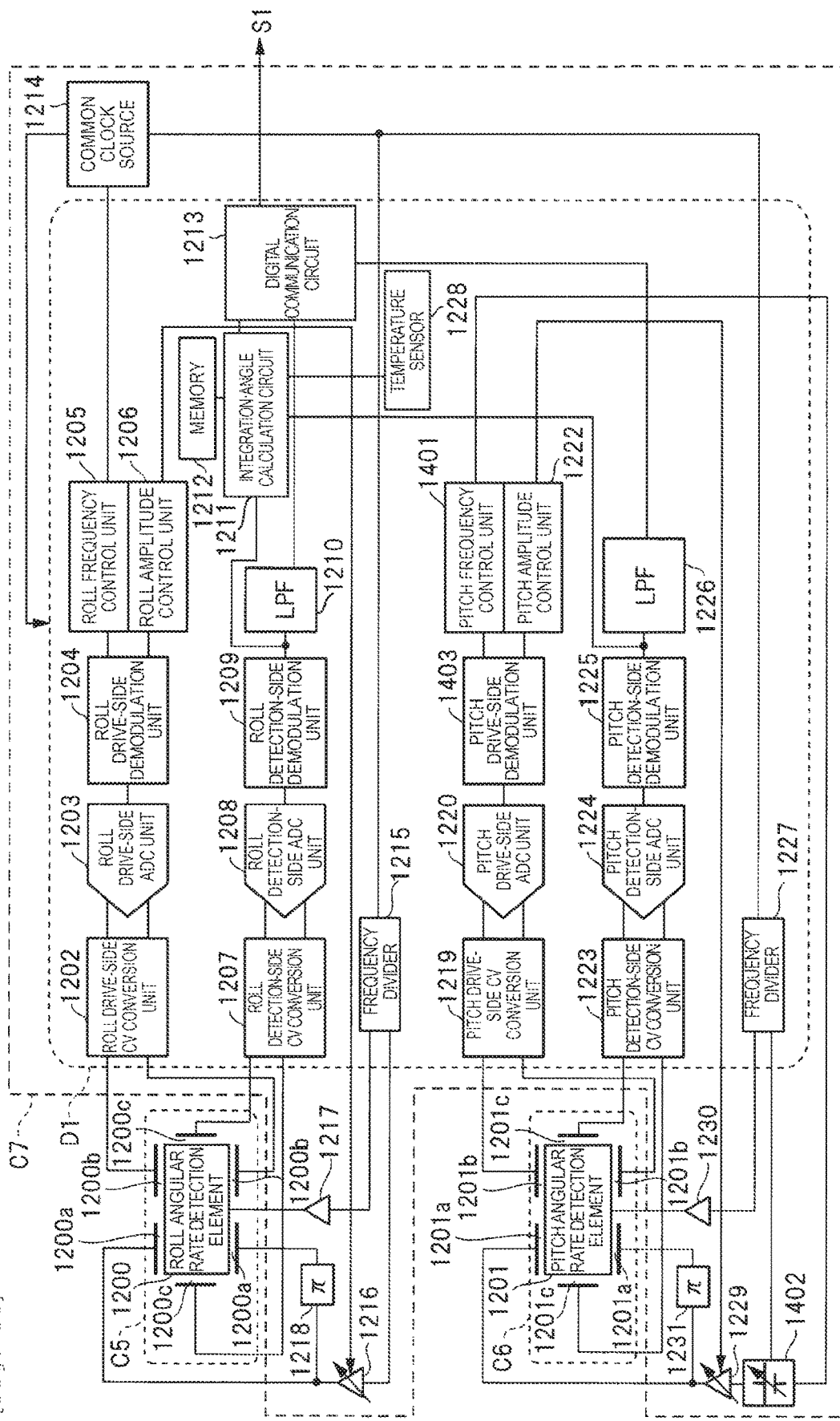
[Fig. 14]

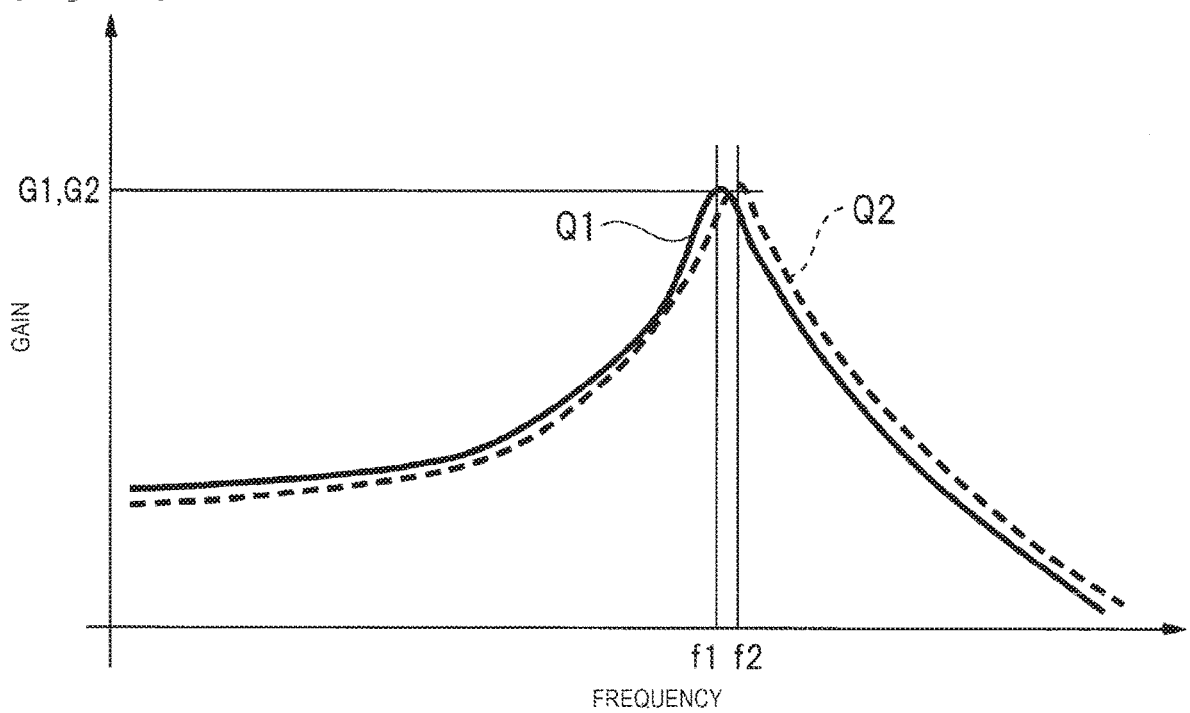
[Fig. 15]

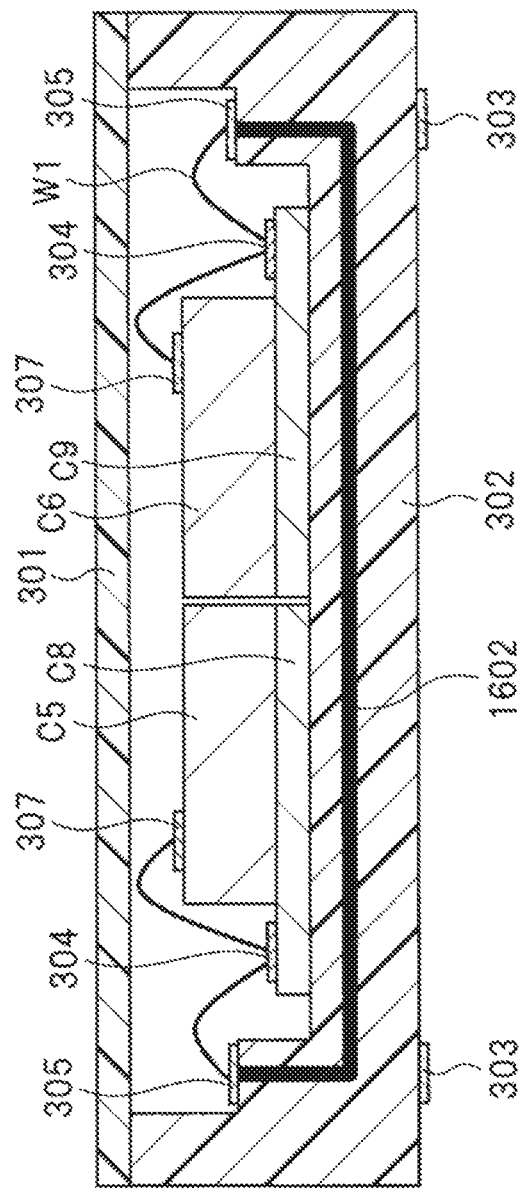
[Fig. 16]

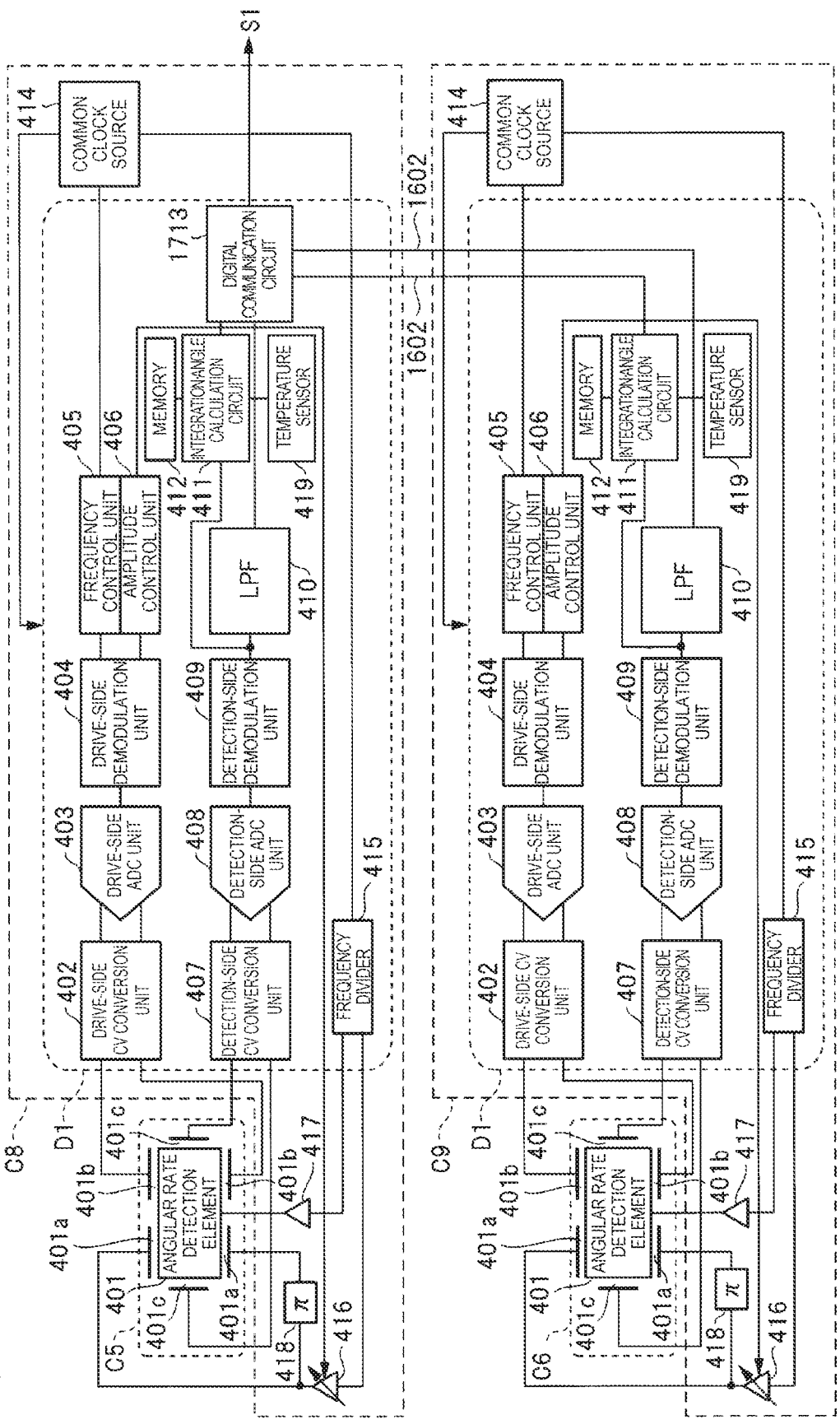
[Fig. 17]

[Fig. 18]
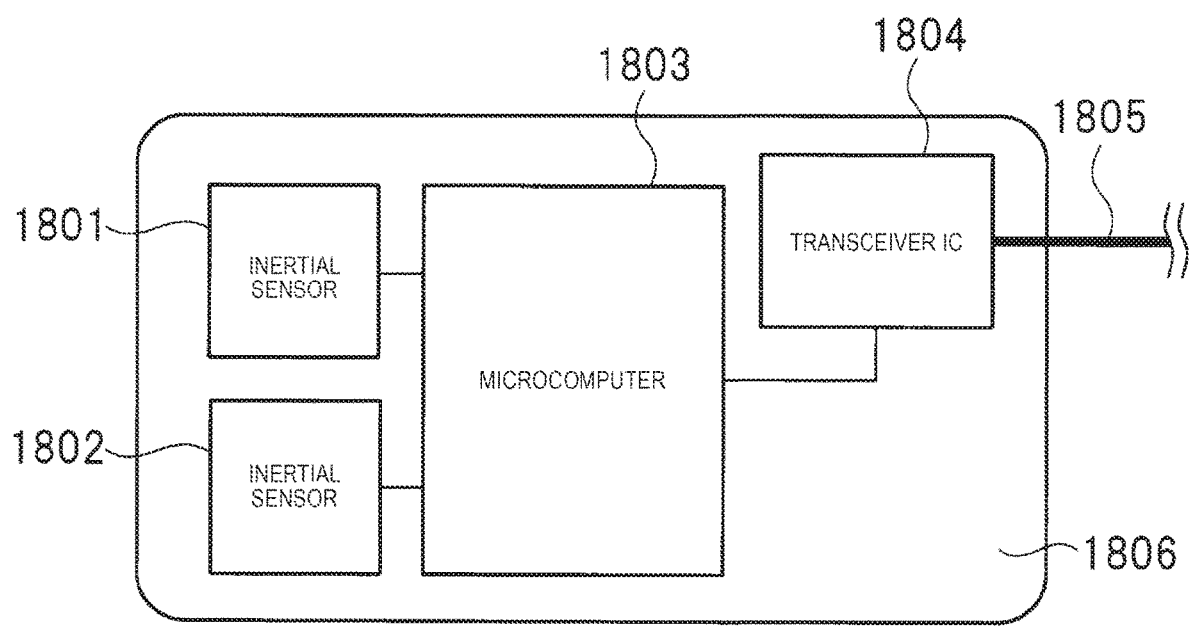

INERTIAL SENSOR

TECHNICAL FIELD

The present invention relates to an inertial sensor, that is, a rate gyroscope, an accelerometer, or a sensor for calculating an angle by signal processing thereof.

BACKGROUND ART

An inertial sensor is one application example of a device manufactured by using a semiconductor micro-fabrication technology which is called micro electro mechanical systems (MEMS). Because an MEMS inertial sensor is manufactured by using a semiconductor process, a large number of detection elements can be made in parallel. This leads to a lower price of the inertial sensor which was conventionally a high price and realizes an in-vehicle inertial sensor.

In particular, there is an application of an inertial sensor for detecting an inclination of a vehicle body. That is, there is an application to a safety device that protects a passenger from injury by detecting and controlling a roll inclination of the vehicle body and a pitch inclination, and activating the safety device.

In general, there are two methods of detecting an inclination. First, since the gravity is always 1 g (9.8 m/s$^2$) in a vertical direction, there is a method of obtaining an inclination by calculating an inverse trigonometric function from an output of an accelerometer. If there is an accelerometer of at least 1 axis, the method can be realized, but in the inverse trigonometric function, a sensitivity difference generated by the angle of the inclination is large (for example, in a Sin function, an inclination is large with respect to an angle change near an angle of 0 degrees, but the inclination is small with respect to the angle change near an angle of ±90 degrees). Therefore, the inclination is often obtained from a ratio of a two-axis accelerometer.

However, there is a problem in using the above-described method as an in-vehicle inclination detection sensor. That is, when the vehicle body is running on a curve or accelerating, a centrifugal force is generated so that the acceleration other than the gravity is applied to the sensor. In this case, it is impossible to obtain an accurate inclination by the calculation method based on the inverse trigonometric function assuming that in the acceleration applied to the sensor, a sum of each axis is 1 g.

On the other hand, as another method, there is a method of time-integrating an angular rate. Since the unit of the angular rate is degree/second, it is possible to detect an angle (direction) at which the sensor is inclined by time-integrating an output of a rate gyroscope.

For example, PTL 1 is available as a background art of the present technical field. In PTL 1, an attitude angle measuring apparatus, which obtains an attitude angle by time-integrating a signal having a higher reliability among the angular rate estimation results obtained by signal processing an output of the rate gyroscope and an output of the accelerometer, is disclosed.

In addition, as a configuration example of an angular rate detection element and a detection circuit for detecting the angular rate, there is an example disclosed in PTL 2.

CITATION LIST

Patent Literature

PTL 1: JP-A-2008-256381
PTL 2: JP-A-2011-64515

SUMMARY OF INVENTION

Technical Problem

As a result of examining a case of using a configuration that obtains an angle by the integration of the angular rate as disclosed in PTL 1, the following problem has been clarified.

Basically, in a case where the integration is performed by digital signal processing, a value obtained by multiplying a sampling interval by the output of the angular rate is integrated. Therefore, an error between a value of the sampling interval used for the integration and an actual sampling interval is directly related to an error in angle calculation.

However, as disclosed in PTL 2, in a case where a configuration, in which an operation clock of an angular rate detection circuit of a sensor is synchronized with a resonant frequency of an angular rate detection element, is employed, due to variation existing at the resonant frequency of the angular rate detection element, the operation clock of the angular rate detection circuit also varies accordingly, and a similar variation also occurs in the sampling interval for digital signal processing. In other words, in the rate gyroscope having the "configuration in which the angular rate detection circuit of the sensor is synchronized with the resonant frequency of the angular rate detection element" which is described above, although the detection circuit itself can recognize whether or not it is synchronized with the detection element, there is an essential problem in the circuit configuration that the circuit itself cannot recognize what kind of frequency synchronization is in progress. As a result, the fact that the sampling interval necessary for the integration is unknown poses a burden on time and apparatus such as individual correction after assembling the sensor thereby resulting in an increase in cost of the sensor.

In addition, it is also conceivable to use a method of periodically acquiring an output of a rate gyroscope and integrating the angular rate with a microcomputer having a clock source of high accuracy such as a crystal vibrator, which is a module different from the sensor. In this case, there is a problem of (1) when a communication error or signal saturation occurs, the error remains semi-permanently in an integration error, (2) communication between the sensor and the microcomputer needs to be performed frequently for high integration accuracy, (3) since there is a low pass filter (LPF) of the sensor, an angular rate component having a frequency exceeding a passband of the LPF cannot be reflected in the integration, or the like. In particular, in a case where a sensor and a microcomputer are connected to each other by a communication method other than one-to-one communication like a controller area network (CAN) bus, there is a concern that communication congestion or the like affects other systems.

An object of the invention is to realize an angle output having high accuracy with less integration error in an integration circuit for angle detection, in an inertial sensor that has an angular rate detection circuit having a configuration synchronized with a resonant frequency of an angular rate detection element.

The above and other objects, and novel features of the invention will be apparent from the description of the specification and accompanying drawings.

Solution to Problem

An outline of representative one of the inventions disclosed in the present application will be described briefly as follows.

An inertial sensor in an embodiment includes an angular rate detection element having a mechanical structure for detecting an angular rate and an angular rate detection circuit for detecting the angular rate from the angular rate detection element. The angular rate detection circuit calculates an angle by sampling a signal obtained from the angular rate detection element at a discrete time synchronized with a drive frequency of the angular rate detection element.

Advantageous Effects of Invention

Effects obtained by representative one of the inventions disclosed in the present application will be described briefly as follows.

According to an embodiment, in the inertial sensor that includes the angular rate detection circuit having the structure synchronized with the resonant frequency of the angular rate detection element, it is possible to realize an angle output having high accuracy with less integration error in an integration circuit for detecting an angle.

BRIEF DESCRIPTION OF DRAWINGS

FIG. 1 is a sectional view illustrating an example of a structure of an inertial sensor in Embodiment 1 of the invention.

FIG. 2 is a configuration diagram illustrating an example of a configuration of the inertial sensor in Embodiment 1 of the invention.

FIGS. 3A and 3B are graphs illustrating examples of the relationship between a vibration frequency of a vibrator and a sampling timing of an angular rate in Embodiments 1 to 4 of the invention.

FIG. 4 is a diagram illustrating an example of a configuration of a drive frequency measurement system in Embodiment 1 of the invention.

FIG. 5 is a graph illustrating an example of a change rate of a resonant frequency with respect to a temperature of a resonator in Embodiments 1 to 4 of the invention.

FIG. 6 is a graph illustrating an example of a concept of standby for a rise of an angular rate detection element and an effect of an output mask and a reset request function in Embodiment 1 of the invention.

FIG. 7 is a diagram illustrating minimum necessary configuration elements configuring the inertial sensor in Embodiment 1 of the invention.

FIG. 8 is a sectional view illustrating an example of a structure of an inertial sensor in Embodiment 2 of the invention.

FIG. 9 is a configuration diagram illustrating an example of a configuration of the inertial sensor in Embodiment 2 of the invention.

FIGS. 10A and 10B are diagrams illustrating examples of the relationship between an inclination, gravity, and a centrifugal force in Embodiment 2 of the invention.

FIG. 11 is a sectional view illustrating an example of a structure of an inertial sensor in Embodiment 3 of the invention.

FIG. 12 is a configuration diagram illustrating an example of a configuration of the inertial sensor in Embodiment 3 of the invention.

FIG. 13 is a graph illustrating an example of a drive-side frequency response and a detection-side frequency response of two angular rate detection elements in Embodiment 3 of the invention.

FIG. 14 is a configuration diagram illustrating an example of a configuration of another inertial sensor in Embodiment 3 of the invention.

FIG. 15 is a graph illustrating an example of another drive-side frequency response and another detection-side frequency response of two angular rate detection elements in Embodiment 3 of the invention.

FIG. 16 is a sectional view illustrating an example of a structure of an inertial sensor in Embodiment 4 of the invention.

FIG. 17 is a configuration diagram illustrating an example of a configuration of the inertial sensor in Embodiment 4 of the invention.

FIG. 18 is a configuration diagram illustrating an example of a configuration of a sensor module in Embodiment 4 of the invention.

DESCRIPTION OF EMBODIMENTS

In the following embodiments, if necessary for the sake of convenience, description will be divided into a plurality of sections or embodiments, but unless otherwise stated, they are not unrelated to each other, and one section or embodiment is related to modification examples, details, or supplementary explanation of a part or all of the other sections or embodiments. In addition, in the following embodiments, in a case where reference is made to the number (including the number, a numerical value, an amount, a range, or the like) of elements, unless otherwise stated and a case where it is clearly limited to a specific number in principle, it is not limited to the specific number, and it may be the specific number or more or less.

Further, in the following embodiments, it is needless to say that the constituent elements (including element steps or the like) are not necessarily indispensable unless otherwise stated and a case where it is considered to be obviously indispensable in principle. Similarly, in the following embodiments, when referring to the shapes, positional relationships, or the like of constituent elements and the like, substantially similar or similar to the shape and the like is included, unless otherwise stated and a case where it is considered obviously limited to a specific number in principle. This also applies to the above numerical values and ranges.

[Outline of Embodiments]

First, an outline of embodiments will be described. In the outline of the embodiments, as an example, corresponding constituent elements, reference symbols, and the like in the embodiments will be described in parentheses.

An inertial sensor in an embodiment includes an angular rate detection element (angular rate detection element chips C1, C5, and C6) having a mechanical structure for detecting an angular rate, and an angular rate detection circuit (signal processing LSI chips C2, C4, C7, C8, and C9) for detecting the angular rate from the angular rate detection element. The angular rate detection circuit calculates an angle by sampling a signal obtained from the angular rate detection element at a discrete time synchronized with a drive frequency of the angular rate detection element.

Hereinafter, each embodiment will be described in detail with reference to the drawings based on the outline of the above-described embodiments. Moreover, in all drawings for explaining the embodiments, in principle, the same reference numerals or related symbols are given to the same members, and the repetitive description thereof will be omitted. In addition, in the following embodiments, the description of the same or similar portions will not be repeated in principle unless particularly necessary.

Also, in the drawings used in the embodiments, hatching may be omitted to make the drawing easy to see even in a sectional view. In addition, even in a plan view, hatching may be added to make the drawing easy to see.

Embodiment 1

The inertial sensor in Embodiment 1 will be described with reference to FIGS. 1 to 7. In Embodiment 1, in addition to an output of an angular rate, an example of the inertial sensor that outputs an angle to the outside will be described.

<Structure of Inertial Sensor>

First, a structure of the inertial sensor in Embodiment 1 will be described with reference to FIG. 1. FIG. 1 is a sectional view illustrating an example of a structure of the inertial sensor.

In the inertial sensor in Embodiment 1, the angular rate detection element chip C1 (hereinafter, also referred to as an angular rate detection element) and the signal processing LSI chip C2 are provided in the sensor so that the angular rate can be detected. The angular rate detection element chip C1 is provided with a pad 306 on a main surface and is connected through the pad 306. The signal processing LSI chip C2 is provided with a pad 304 on a main surface and is connected through the pad 304.

In the inertial sensor illustrated in Embodiment 1, the signal processing LSI chip C2 is disposed on a sensor package unit 302 and the angular rate detection element chip C1 is mounted on the signal processing LSI chip C2. The signal processing LSI chip C2 and the angular rate detection element chip C1 are electrically connected through a bonding wire W1 provided between the pad 304 of the signal processing LSI chip C2 and the pad 306 of the angular rate detection element chip C1. In addition, the signal processing LSI chip C2 is electrically connected to an external electrode 303 by connection of the bonding wire W1 to an electrode 305 provided in the sensor package unit 302. In addition, a cap portion 301 is a "lid" of the sensor package unit 302 and constitutes a sensor module (one unit of sensor).

Here, a packaging method of the inertial sensor is irrelevant to the contents disclosed in the present application. That is, the disclosure contents of the present application can be realized by various packaging methods such as a resin package by transfer molding and a pre-mold package for fixing a chip on a substrate such as ceramics.

<Configuration and Operation of Inertial Sensor>

A configuration of the inertial sensor in Embodiment 1 will be described with reference to FIG. 2. FIG. 2 is a configuration diagram illustrating an example of the configuration of the inertial sensor.

The inertial sensor in Embodiment 1 includes an angular rate detection element 401 of a portion of the angular rate detection element chip C1 and a detection circuit of a portion of the signal processing LSI chip C2. The angular rate detection element chip C1 is the angular rate detection element having the mechanical structure for detecting the angular rate. The signal processing LSI chip C2 is an angular rate detection circuit for detecting the angular rate from the angular rate detection element.

The angular rate detection element 401 has a drive electrode 401a, a monitor electrode 401b, and a detection electrode 401c. The detection circuit includes a drive-side capacitor to voltage (CV) conversion unit 402, a drive-side analog to digital convertor (ADC) unit 403, a drive-side demodulation unit 404, a frequency control unit 405, and an amplitude control unit 406. In addition, the detection circuit includes a detection-side CV conversion unit 407, a detection-side ADC unit 408, a detection-side demodulation unit 409, an LPF 410, an integration•angle calculation circuit 411, a memory 412, and a digital communication circuit 413. Furthermore, the detection circuit includes a common clock source 414, a frequency divider 415, a variable amplifier 416, an amplifier 417, a phase inverter 418, and a temperature sensor 419. In the detection circuit, the CV conversion units 402 and 407, the ADC units 403 and 408, the demodulation units 404 and 409, the frequency control unit 405, the amplitude control unit 406, the LPF 410, the integration•angle calculation circuit 411, the memory 412, the digital communication circuit 413, the frequency divider 415, and the temperature sensor 419 constitute a digital unit D1.

Here, the angular rate detection element 401 is a so-called vibration type angular rate detection element, detects a new vibration component based on the Coriolis force generated in a detection direction orthogonal to a drive vibration direction when the angular rate is applied to the vibrator that vibrates in a predetermined driving direction, and outputs angular rate information based thereon. Here, the Coriolis force Fc is expressed by the following Equation 1.

$$Fc = 2 \cdot m \cdot \Omega \cdot X \cdot \omega d \cdot \cos(\omega d \cdot t) \quad \text{(Equation 1)}$$

In Equation 1, Fc is the Coriolis force, in is a mass of a movable portion, $\Omega$ is an applied angular rate, X is a vibration amplitude in the driving direction, $\omega d/2\pi$ is the drive frequency, and t is a time.

According to Equation 1, it is found that it is necessary to increase the mass of the movable portion, the vibration amplitude in the driving direction, and the drive frequency in order to improve sensitivity, that is, to obtain more Coriolis force. On the other hand, the maximum amplitude in the driving direction is expressed by Equation 2.

$$X = \frac{F_d}{k_d} \frac{1}{\left\{\left[1 - \left(\frac{\omega_d}{\omega_r}\right)^2\right]^2 + \left[\frac{1}{Q_d}\frac{\omega_d}{\omega_r}\right]^2\right\}^{1/2}} \quad \text{(Equation 2)}$$

In Equation 2, X is the vibration amplitude in the driving direction, $\omega_d/2\pi$ is the drive frequency, $\omega_r$ is a natural frequency in the driving direction, $Q_d$ is a mechanical quality factor in the driving direction, $k_d$ is a spring constant of a supporting beam configuring the vibrator, and $F_d$ is a driving force.

Therefore, in general, the vibration type angular rate detection element employs a configuration that maintains vibration at the natural frequency (resonant frequency) in the driving direction so that the efficiency of a driving voltage versus the sensitivity becomes the best, and obtains an amplitude gain multiplied by a mechanical quality factor, thereby obtaining the highest signal to noise ratio (SNR) with respect to the applied angular rate. This also applies to Embodiment 1.

In Embodiment 1, a clock of the signal processing LSI chip is synchronized with the resonant frequency of the angular rate detection element in the same manner as described in the above-described PTL 2. That is, the frequency generated by the common clock source 414 or the division or multiplication thereof coincides with the resonant frequency of the angular rate detection element 401 in the driving direction in a stead state of the circuit. The number of sampling points of demodulation of a signal is reduced and the demodulation is easily performed in a digital signal region by employing such a configuration. This leads to a reduction in a chip area, that is, a reduction in cost, particularly in the LSI chip using a thin line process.

The angular rate detection element 401 has the drive electrode 401a for bringing the driving force causing vibration in the driving direction by an electrostatic force and the monitor electrode 401b for reading a vibration displacement in the driving direction as a change in an electrostatic capacity. The clock generated by the common clock source 414 is divided into an appropriate frequency by the frequency divider 415 and a carrier signal converted into an appropriate voltage level through the amplifier 417 is given to the movable portion of the angular rate detection element 401. The electrostatic capacity configured by the monitor electrode 401b changes due to a displacement of the movable portion of the angular rate detection element 401. Therefore, an alternating current according to the electrostatic capacity configured by the monitor electrode 401b to which the carrier signal is applied, that is, a current according to the displacement of the movable portion of the angular rate detection element 401 is generated.

Next, displacement information of the angular rate detection element 401 indicated by the current causes a capacitor component to convert into a voltage through the drive-side CV conversion unit 402 in the signal processing LSI chip C2, and a digital value is obtained through the drive-side ADC unit 403. Moreover, although the CV conversion unit 402 is not a switched capacitor type CV conversion circuit or a continuous time type CV conversion circuit depending on a configuration thereof, it is desirable that the demodulation of the carrier signal is performed in the CV conversion unit 402. In the continuous time type CV conversion circuit, an additional demodulation circuit is required, and here, for simplicity, the switched capacitor type CV conversion circuit which can also serve as the demodulation circuit is assumed. In addition, a format of ADC is not limited, such as a ΣΔ method or a successive approximation method.

The signal converted into the digital region performs two processes of a demodulation process in which the demodulation is performed using a reference signal having the same frequency as that of the drive signal and a phase matched with the displacement signal and a displacement vibration amplitude component is extracted, and a demodulation process in which the demodulation is performed using the reference signal having the same frequency as that of the drive signal and a phase advanced by 90 degrees relative to the displacement signal, and a difference between the resonant frequency of the angular rate detection element 401 in the driving direction and the drive frequency is extracted, in the drive-side demodulation unit 404 of the digital signal region.

In the demodulation unit 404, as described above, the clock of the signal processing LSI chip C2 is synchronized with the resonant frequency of the angular rate detection element 401. Therefore, even if the resonant frequency of the angular rate detection element 401 varies due to variation in the signal processing LSI chip C2, there is a feature that the number (number of divisions of a sine wave signal) of samplings of one cycle can always be kept constant.

The amplitude information obtained by the former demodulation process is controlled by the amplitude control unit 406 so that the vibration of the angular rate detection element 401 in the driving direction reaches a predetermined desired amplitude and a control output is used for gain adjustment of the variable amplifier 416. Each of the drive signals is applied to one drive electrode directly and to the other drive electrode via the phase inverter 418, so that the drive signals (here, the drive signal is the frequency division of the common clock source 414 and the frequency division thereof is realized by the frequency divider 415) undergoing the gain adjustment are in phase opposition to each other between facing electrodes in the drive electrode 401a of the angular rate detection element 401. The angular rate detection element 401 maintains vibration at a predetermined amplitude due to these control loops. On the other hand, a difference between the resonant frequency and the drive frequency of the angular rate detection element 401 in the driving direction obtained by the latter demodulation process is given to the frequency control unit 405, the control output is given to the common clock source 414, and a frequency control loop is configured so as to face a direction in which the difference between the resonant frequency and the drive frequency of the angular rate detection element 401 in the driving direction is reduced.

The resonant frequency and the drive frequency of the angular rate detection element 401 in the driving direction coincide with each other due to the above-described configuration. In addition, the resonant frequency of the angular rate detection element 401 in the driving direction shows a variation depending on the accuracy of semiconductor processing or the like. However, if the resonant frequency is within a certain range of the resonant frequency, the common clock source 414 is automatically synchronized with the resonant frequency and also in the demodulation process, the clock of the signal processing LSI chip C2 is synchronized with the resonant frequency of the angular rate detection element 401 by the operation of the frequency control unit 405. Therefore, even if the resonant frequency of the angular rate detection element 401 varies due to the variation in the signal processing LSI chip C2, the number of samplings of one cycle is always constant.

Here, the clock of the digital unit D1 of the circuit is based on the common clock source 414 in all other circuit elements as well as the demodulation unit 404. The fact that it is based on the common clock source 414 means that the clock of the digital unit D1 is also synchronized with the resonant frequency of the angular rate detection element 401 in the driving direction. Synchronizing the clock of the digital unit D1 with the resonant frequency of the angular rate detection element 401 in the driving direction is not a requirement for the angular rate detection in the vibration type rate gyroscope. However, the reference clock of the digital unit D1 is not required to be separately prepared and frequency stability using a high mechanical quality factor of the angular rate detection element 401 is obtained by such a configuration. Therefore, synchronizing the clock of the digital unit D1 with the resonant frequency of the angular rate detection element 401 in the driving direction is advantageous from the viewpoint of simplification of the system configuration.

Next, a procedure for detecting the angular rate will be described. The angular rate detection element 401 includes the detection electrode 401c that reads the vibration displacement in the detection direction as a change in the electrostatic capacity. As described above, when the angular rate detection element 401 vibrates in a predetermined driving direction, when the angular rate is applied, the Coriolis force is generated in the detection direction orthogonal to the drive vibration direction. The capacity of the detection electrode 401c is changed by the displacement due to the Coriolis force. The change in the capacity is converted into a current by a carrier signal converted into an appropriate voltage level through the amplifier 417 and is converted into a voltage by the detection-side CV conversion unit 407, and is further converted into a digital value by the detection-side ADC unit 408, and an amplitude of the vibration, that is, the angular rate in the detection direction is obtained by the detection-side demodulation unit 409 which performs the demodulation at a phase matched with the vibration in the detection direction. The angular rate component obtained here drops unnecessary high frequency component via the LPF 410 and is output as a signal S1 from the digital communication circuit 413 to a host system.

Next, a circuit configuration relating to the integration of an output of the angular rate in Embodiment 1 will be described. FIG. 3 is an image of when the angular rate is sampled for time integration in the signal processing circuit of the rate gyroscope using a circuit configuration in which the resonant frequency of the angular rate detection element 401 in the driving direction coincides with the drive frequency. FIG. 3 is a graph illustrating an example of a relationship between a vibration frequency (horizontal axis is time and vertical axis is the displacement of the vibrator) of the vibrator and a sampling timing (horizontal axis is time and vertical axis is the angular rate) of an angular rate. FIG. 3(*a*) illustrates a time-series displacement of the vibration, an angular rate signal obtained from the time-series displacement, and a sampling interval $T_s$ in a sensor in which the resonant frequency of the angular rate detection element 401 in the driving direction is relatively higher than that of FIG. 3(*b*). FIG. 3(*b*) illustrates a time-series displacement of the vibration, an angular rate signal obtained from the time-series displacement, and a sampling interval $T_s$ in a sensor in which the resonant frequency of the angular rate detection element 401 in the driving direction is lower than that of FIG. 3(*a*).

As illustrated in FIGS. 3(*a*) and 3(*b*), if the resonant frequency of the angular rate detection element 401 in the driving direction is different, all the clocks are synchronized with the resonant frequency of the angular rate detection element 401 in the driving direction. Therefore, the sampling interval will also be different, accordingly. Hereinafter, Equation 3 of an angle obtained by discrete-time integration is indicated.

$$\theta = \Sigma \Omega \cdot T_s \quad \text{(Equation 3)}$$

In Equation 3, θ is an angle obtained by a result of the integration, Ω is the applied angular rate, and $T_s$ is the sampling interval.

As indicated from Equation 3, for example, in a case where there are two samples of which the resonant frequency of the angular rate detection element 401 in the driving direction is different by 10%, if the sampling interval $T_s$ is fixed, an error occurring in the angle calculation of the samples is 10%. In a more specific example, in a design in which a central value of the resonant frequency is 10 kHz, in a case where $T_s$ is estimated to be 0.1 ms and collectively set, an error occurring between two samples having the resonant frequency of 9.5 kHz and 10.5 kHz of the angular rate detection element 401 in the driving direction due to processing variation is approximately 10%.

As described above, in order to solve the problem of the integration error due to the variation of the resonant frequency of the angular rate detection element 401 in the driving direction, in Embodiment 1, the memory 412 is provided in the integration•angle calculation circuit 411 and a circuit for storing the drive-side resonant frequency of the angular rate detection element 401 measured in advance at a wafer level of prober inspection or the like and a value (described later) according thereto is added thereto. The integration•angle calculation circuit 411 performs the integration calculation (angle calculation of the angle) according to Equation 3 and the sampling interval in the integration•angle calculation circuit 411 is the resonant frequency of the angular rate detection element 401 in the driving direction stored in the memory 412 or multiplication•division thereof. For example, if the sampling frequency of the integration•angle calculation circuit 411 is the division of the resonant frequency of the angular rate detection element 401 in the driving direction by Y, $T_s$ is obtained by dividing Y from a reciprocal of the resonant frequency of the angular rate detection element 401 in the driving direction.

As described above, in the configuration of the detection circuit as in Embodiment 1, although the detection circuit itself can recognize whether or not the common clock source 414 is synchronized with the resonant frequency of the angular rate detection element 401 in the driving direction, it is not possible to know a frequency absolve value of what kind of frequency is actually synchronized. On the other hand, if the drive-side resonant frequency of the angular rate detection element 401 is stored in the memory 412 according to the method indicated in Embodiment 1, the sampling interval in the integration•angle calculation circuit 411 becomes obvious from information recorded in the memory 412. Therefore, it is possible to perform the angle calculation of the angle having high accuracy without adding measures against an increase in cost or an increase in the risk of failure such as addition of an external clock source such as a crystal vibrator, application of a clock signal from the outside, and an input of sampling trigger from a host system.

Here, the memory 412 can be realized by any nonvolatile memory such as a mask ROM and a flash ROM regardless of a mounting method. In addition, even with a volatile memory, if the resonant frequency is given from the host system by the digital communication circuit 413 at the time of startup, a desired function can be maintained.

In addition, regarding the drive-side resonant frequency of the angular rate detection element 401 stored in the memory 412, it is not necessarily to be the resonant frequency itself, and it is obvious that Embodiment 1 can be realized as long as the value is based the drive-side resonant frequency of the angular rate detection element 401 such as the multiplication•division value of the resonant frequency or the reciprocal thereof (this is defined as the drive-side resonant frequency of the angular rate detection element 401 or a value according thereto).

In addition, the drive-side resonant frequency of the angular rate detection element 401 is not necessarily to be a value of the resonant frequency directly measured for each detection element. The degree of rigor can be chosen according to the desired accuracy such as a result complemented from a trend obtained as a result of measuring several chips on the wafer. If variation in the wafer, variation in a lot, and variation in a photomask level satisfy the specification of the sensor, the value to be stored in the memory 412 can be determined by measuring one device in the wafer, one device in the lot, and one device from the wafer manufactured with the photomask.

Furthermore, another method will be described with reference to FIG. 4. FIG. 4 is a diagram illustrating an example of a configuration of a drive frequency measurement system. As illustrated in FIG. 4, in a pre-shipment inspection system configured of an inertial sensor 201 and a measuring device 202, a frequency of a drive signal obtained from the inertial sensor 201 is measured by the measuring device 202 and is returned to the inertial sensor 201 as frequency information, and the drive-side resonant frequency of the angular rate detection element 401 may be recorded in the memory 412. In this case, there is the inertial sensor 201 having a function of outputting the drive signal or a digital value thereof, and being characterized in that the drive-side resonant frequency of the angular rate detection element 401 is recorded in the memory 412. In addition, for example, it is possible to select a test mode (TEST=H) for the inertial sensor 201 and the drive signal obtained from the inertial sensor 201 may be output only during pre-shipment inspection. In general, when using a sensor, it is not necessary to monitor the drive signal, so that it is possible to satisfy the function as a sensor without necessarily opening the function of outputting the drive signal from the inertial sensor 201.

In addition, in FIG. 2, the signal given to the integration•angle calculation circuit 411 is output immediately after the detection-side demodulation unit 409, but this may be an input from a subsequent stage of the LPF 410. Since the former can be integrated including up to a high frequency component, in general, it is possible to expect a more accurate angle calculation than using a signal after passing through the LPF 410. On the other hand, since noise of high frequency is also integrated, it is not a suitable configuration depending on a noise profile of a circuit. On the other hand, in the latter configuration, since only a signal in a band where wideband noise is dropped can be obtained, in a case of measuring a measurement object of which response is not high, a configuration, in which the signal passing through the LPF 410 like the latter is input into the integration•angle calculation circuit 411, may be preferable.

In addition, although not illustrated, in a case where the gain of the signal is adjusted in front and rear stages of the LPF 410, a signal before the gain adjustment or a signal of which a gain is adjusted for the integration calculation is given to the integration•angle calculation circuit 411 so that it is possible to prevent occurrence of the integration error due to signal saturation. This can be said to be signal processing that cannot be realized by a system configured of separate integrated circuit (IC) units just like a sensor module and a microcomputer.

FIG. 5 is a graph illustrating an example of a change rate of a resonant frequency with respect to a temperature of a resonator. In the graph of FIG. 5, the change rate (%) of the resonant frequency with respect to the temperature (° C.) of the vibrator manufactured using single crystal silicon is illustrated. Since Young's modulus of silicon fluctuates according to the temperature, it is known that the resonant frequency of the vibrator also changes according to the temperature as illustrated in FIG. 5. In the example of FIG. 5, the change rate of the resonant frequency changes from approximately 0.25% to approximately −0.45% as the temperature changes from −50° C. to 150° C. Therefore, the integration•angle calculation circuit 411 may have a function of receiving an output of the temperature sensor 419 and correcting the sampling interval $T_s$ from the temperature and a profile of the resonant frequency as illustrated in FIG. 5. The graph of FIG. 5 is written by Equation 4 and it is possible to improve an error due to a temperature characteristic of Young's modulus by performing correction according to, for example, Equation 4.

$$E=E_0-B \cdot T \cdot e^{(-T_0/T)} \quad \text{(Equation 4)}$$

In Equation 4, T is a temperature, E is Young's modulus at the temperature T, $E_0$ is a longitudinal elastic modulus at 0K, B is a temperature coefficient, and $T_0$ is an approximation coefficient.

As indicated in Equation 2, in general, in the vibration type rate gyroscope, the driving voltage versus vibration ratio on the driving side is increased and the SNR is improved by utilizing the vibration gain indicated by the mechanical quality factor. On the other hand, in order to utilize the value of the mechanical quality factor, it takes time to store vibration energy of the frequency at a certain frequency. In the simplest case, in a step-response manner, considering the frequency of a certain amplitude is continuously provided, a "time constant" which is a time to reach 63.2% of the maximum amplitude is a value obtained by dividing the number that is twice the mechanical quality factor by the natural frequency. That is, it takes time to store energy until reaching the drive amplitude at which a normal output is output as the rate gyroscope immediately after being conducted.

FIG. 6 is a graph illustrating an example of a concept of standby for a rise of an angular rate detection element and an effect of an output mask and a reset request function. FIG. 6 illustrates an example of the drive amplitude of the angular rate detection element (here, note that it shows an envelope of the displacement as it is not the displacement but the amplitude). If the drive amplitude of the angular rate detection element does not rise sufficiently, the rise of the rate gyroscope is not appropriate for the rate gyroscope and is also not appropriate to perform the angle calculation. In Embodiment 1, when the drive amplitude of the angular rate detection element 401 is not within a predetermined threshold range, a function of applying a mask to an angle output to be output from the digital communication circuit 413 or outputting a flag indicating that an angle output cannot be used is added. By employing such a configuration, it is possible to eliminate a concern that the host system uses an angle output which is originally incorrect and wrong for the control thereof.

In addition, in Embodiment 1, a function of resetting the angle output is provided in response to a reset request (pulse H) from the host system. The reset is a function of setting the integration value of the integrator to zero. For example, in a case of a vehicle application or a flying object such as a so-called drone (unmanned aerial vehicle), it is preferable that the host system recognizes that the vehicle or the airplane is in a stopped state based on a vehicle speed pulse, GPS positioning information, another type of sensor information of the accelerometer, or the like, and is reset at that time point. In Embodiment 1, since the circuit inside the rate gyroscope (inertial sensor) integrates an angular rate and calculates an angle, the idea of having a communication function capable of resetting integration by using a reset signal from the host system that performs determination of stopped state is totally different from a general configuration in which the angular rate is integrated on the host system side of the related art and the integration value is reset on the inside of the host system.

The minimum configuration of Embodiment 1 is illustrated in FIG. 7. FIG. 7 is a diagram illustrating the minimum necessary configuration elements configuring the inertial sensor. In FIG. 7, there is the common clock source 414, the frequency thereof is controlled by the frequency control unit 405, and the circuit configuration is such that the resonant frequency and the drive frequency of the angular rate detection element chip C1 in the driving direction coincide with each other. Here, the integration•angle calculation circuit 411, which performs the integration•angle calculation from the angular rate, is a circuit that performs the angular rate integration having high accuracy by a configuration in which the sampling interval used for the integration calculation is stored in the memory 412 by being synchronized with the clock of the common clock source 414.

Moreover, in the specification, it is described that the clock of the signal processing LSI chip is synchronized with the resonant frequency of the angular rate detection element, but it is not always necessary that the drive frequency coincides with the resonant frequency and it may be any frequency as long as the mechanical quality factor can be obtained by a certain amount. In addition, it may not be possible to determine whether or not the drive frequency coincides with the resonant frequency depending on the frequency control. In this case, all the "resonant frequency" in the specification is replaced with the "drive frequency".

<Effects of Embodiment 1>

According to Embodiment 1 described above, in the inertial sensor which includes the angular rate detection circuit having a configuration synchronized with the resonant frequency of the angular rate detection element 401, it is possible to realize the angle output having high accuracy with less integration error in the integration circuit for detecting an angle. That is, accurate integration time is given to the integration calculation for angle detection and it is possible to realize the angle output having high accuracy with less integration error. In other words, it is possible to perform angle detection having high accuracy without performing adjustment after assembling the inertial sensor. More specifically, it is as follows.

(1) The inertial sensor includes the angular rate detection element chip C1 having the mechanical structure for detecting the angular rate, and the signal processing LSI chip C2 that is the angular rate detection circuit for detecting the angular rate from the angular rate detection element chip C1. Therefore, the signal processing LSI chip C2 can calculate the angle by sampling the signal obtained from the angular rate detection element chip C1 at the discrete time synchronized with the drive frequency of the angular rate detection element chip C1.

(2) The signal obtained from the angular rate detection element chip C1 by the signal processing LSI chip C2 can be the angular rate.

(3) The operation clock of the signal processing LSI chip C2 can be synchronized with the drive frequency of the angular rate detection element chip C1.

(4) The signal processing in which the signal processing LSI chip C2 calculates the angle can be the time integration.

(5) The drive frequency of the angular rate detection element chip C1 can be the resonant frequency of the angular rate detection element chip C1.

(6) The drive frequency of the angular rate detection element chip C1 can be set to the frequency at which the gain by the mechanical quality factor of the angular rate detection element chip C1 is obtained.

(7) The drive frequency of the angular rate detection element chip C1 or the value obtained from multiplication or division thereof is stored in advance in the memory 412 that is a storage region within the signal processing LSI chip C2 and the signal processing LSI chip C2 can calculate the angle by using the value stored in the memory 412.

(8) The angular rate used in the integration calculation by the signal processing LSI chip C2 can be the signal before passing through the LPF 410 that is output as the angular rate.

(9) The integration calculation of the signal processing LSI chip C2 can be corrected by the temperature sensor 419.

(10) In the integration calculation of the signal processing LSI chip C2, the integration value can be reset by the reset signal from the outside.

(11) In the integration calculation of the signal processing LSI chip C2, it is detected that the movement of the measurement object does not occur or the acceleration other than the gravity is not applied to the measurement object from the signal indicating the motion state of the measurement object from the outside. The integration value can be reset at the timing of the detection.

(12) The signal processing LSI chip C2 includes the memory 412 and the integration•angle calculation circuit 411. Therefore, the memory 412 can store in advance the value obtained from the drive frequency of the angular rate detection element chip C1 or multiplication or division thereof. The integration•angle calculation circuit 411 calculates the angle by sampling the signal obtained from the angular rate detection element chip C1 at the discrete time synchronized with the drive frequency of the angular rate detection element chip C1 and can calculate the angle by using the value stored in the memory 412 when calculating the angle.

Embodiment 2

An inertial sensor in Embodiment 2 will be described with reference to FIGS. 8 to 10. In the following Embodiment 2, portions which are not mentioned in detail are the same as those in Embodiment 1. In Embodiment 2, an example of the inertial sensor that outputs acceleration to the outside in addition to the angular rate and the angle which are described above will be described.

FIG. 8 is a sectional view illustrating an example of a structure of the inertial sensor in Embodiment 2. In the inertial sensor in Embodiment 2, an angular rate detection element chip C1, an acceleration detection element chip C3 (hereinafter, also referred to as the acceleration detection element), and a signal processing LSI chip C4 are provided in the sensor so that the angular rate and the acceleration can be detected. The angular rate detection element chip C1 is provided with a pad 307 on a main surface and is connected through the pad 307. The acceleration detection element chip C3 is provided with a pad 308 on a main surface and is connected through the pad 308. The signal processing LSI chip C4 is provided with a pad 304 on a main surface and is connected through the pad 304.

In the inertial sensor illustrated in Embodiment 2, the signal processing LSI chip C4 is disposed on a sensor package unit 302 and the angular rate detection element chip C1 and the acceleration detection element chip C3 are mounted on the signal processing LSI chip C4. The signal processing LSI chip C4, the angular rate detection element chip C1, and the acceleration detection element chip C3 are electrically connected respectively through bonding wires W1 provided between the pad 304 of the signal processing LSI chip C4 and the pad 307 of the angular rate detection element chip C1, and the pad 308 of the acceleration detection element chip C3. In addition, the signal processing LSI chip C4 is electrically connected to an external electrode 303 by connection of the bonding wire W1 to an electrode 305 provided in the sensor package unit 302. In addition, a cap portion 301 is a lid of the sensor package unit 302 and constitutes a sensor module.

FIG. 9 is a configuration diagram illustrating an example of a configuration of the inertial sensor. The inertial sensor in Embodiment 2 includes an angular rate detection element 401 of a portion of the angular rate detection element chip C1, acceleration detection elements 1001*a* and 1001*b* of a portion of the acceleration detection element chip C3, and a detection circuit of a portion of the signal processing LSI chip C4. In the acceleration detection elements 1001*a* and 1001*b*, 1001*a* is a Y-direction acceleration detection element and 1001*b* is an X-direction acceleration detection element. The angular rate detection element 401 is the same as that of Embodiment 1. The acceleration detection elements 1001*a* and 1001*b* include electrodes 1001*c* and 1001*d*. In addition to the configuration of Embodiment 1, the detection circuit includes a Y-side CV conversion unit 1002, a Y-side ADC unit 1003, a Y-side LPF 1004, an X-side CV conversion unit 1005, an X-side ADC unit 1006, and an X-side LPF 1007, and the integration•angle calculation circuit 411 is replaced by an integration•angle calculation•diagnosis circuit 1000.

Here, the acceleration detection elements 1001*a* and 1001*b* are respectively electrostatic capacitive elements for detecting static acceleration. When the acceleration is applied in a predetermined displacement direction, the movable portion is displaced. Therefore, a change in the electrostatic capacity generated in the electrodes 1001*c* and 1001*d* is converted from a current into a voltage in the CV conversion units 1002 and 1005 respectively, and is converted into a digital region by the ADC units 1003 and 1006. A component of unnecessary band is removed by the LPF 1004 and 1007, and then an acceleration output to the host system is performed by the digital communication circuit 413. Here, a carrier signal generated from the common clock source 414 included in the signal processing LSI chip C4 via the frequency divider 415 and the amplifier 417 is also applied to the acceleration detection elements 1001*a* and 1001*b*. That is, the carrier signal used for detecting the acceleration is synchronized with the common clock source 414 used for detecting the angular rate. With such a configuration, the detection of both the angular rate and the acceleration can be realized with one signal processing LSI chip C4 at low cost without adding an external clock source such as a crystal vibrator.

Next, in Embodiment 2, a procedure for detecting the inclination will be described. FIG. 10 is a diagram illustrating an example of a relationship between the inclination, a gravity, and a centrifugal force. In FIG. 10, a sensor 100, a gravity 101, a Cos component 102 of the gravity, a Sin component 103 of the gravity, a centrifugal force 104, and a force sum 105 are illustrated in the presence of an inclination (θ). In FIG. 10, (a) illustrates a case where the inclination detection is performed in a state where the centrifugal force is not present and the inclination can be obtained according to Equation 5 using the principle that the gravity 101 is 1 g.

$$\theta 32 \tan^{-1}(x/y) \quad \text{(Equation 5)}$$

In Equation 5, θ is the inclination, x is an acceleration in an x direction, and y is an acceleration in a y direction.

On the other hand, in FIG. 10, since the centrifugal force 104 is present in (b), the principle that a sum of the acceleration applied to the sensor 100 is 1 g is broken and an error occurs in the angle calculation according to Equation 5. In Embodiment 2, a detection circuit configuration, in which reliability of the angle calculation is improved, is provided by using both the angle calculation using the acceleration by Equation 5 and the angle calculation by the integration of the angular rate illustrated in Embodiment 1. The circuit configuration is the configuration illustrated in FIG. 9.

As illustrated in FIG. 9, in Embodiment 2, in the integration•angle calculation•diagnosis circuit 1000, an output signal of the angular rate detection-side demodulation unit 409 and an output signal of the ADC units 1003 and 1006 of acceleration detection are input, inclination detection based on Equation 5 and inclination detection by the angular rate integration are compared, and if a comparison result is within a predetermined threshold value, it is determined that there is no failure and if the comparison result is the threshold value or more, it is determined that there is a failure. In this case, the drive-side resonant frequency of the angular rate detection element 401, or a value based on the drive-side resonant frequency of the angular rate detection element 401 such as multiplication•division value of the resonant frequency, or a reciprocal thereof is stored in the memory 412, and the time integration is performed based thereon.

Furthermore, temperature characteristic correction of the angular rate integration is performed and also the temperature characteristic correction (offset, sensitivity, or scale factor) in calculation for obtaining the inclination from the acceleration is performed by the temperature sensor 419.

In addition, as described in Embodiment 1, means for recognizing that the measurement object such as a communication device that gives a vehicle speed pulse, GPS positioning information, or a reset signal from the host system is stopped may be input into the integration•angle calculation•diagnosis circuit 1000. For example, when the measurement object is stopped, the integration value by the angular rate integration is reset, and if contradiction occurs between an angle detection amount by the angular rate integration and an angle detection amount by the acceleration, it is possible to recognize a failure, although the stopped state is continued.

A sensor may be configured (not illustrated) so that a user can select which value of the angle by the angular rate integration and the angle obtained from the acceleration is to be obtained. For example, since there is a possibility of the centrifugal force entering during traveling, in a case of using the angle by the angular rate integration and the angle from the acceleration in which an absolute angle for slope detection is known during stopping, such an approach is beneficial.

According to Embodiment 2 described above, it is possible to obtain the following different effects in addition to the same effects as those of Embodiment 1. For example, the inertial sensor further includes the acceleration detection element chip C3 having the mechanical structure for the acceleration detection, the signal processing LSI chip C4 including the acceleration detection circuit for detecting the acceleration from the acceleration detection element chip C3. Therefore, in a case where a difference between a result of the angle obtained from the inverse trigonometric function of the acceleration and a result of the angle obtained from the time integration of the angular rate exceeds a certain value, the signal processing LSI chip C4 can determine that which one of the sensors has failed.

Embodiment 3

An inertial sensor in Embodiment 3 will be described with reference to FIGS. 11 to 15. In the following Embodiment 3, portions which are not mentioned in detail are the same as those in Embodiment 1. In Embodiment 3, an example of the inertial sensor that outputs the angular rate of further one axis to the outside in addition to the angular rate of one axis which is described above will be described. Particularly, here, it is assumed that the angular rate of roll and pitch is detected. Moreover, a mechanical structure for detecting the angular rate may be three axes or more.

FIG. 11 is a sectional view illustrating an example of a structure of the inertial sensor in Embodiment 3. In the inertial sensor in Embodiment 3, angular rate detection element chips C5 and C6, and a signal processing LSI chip C7 are provided in the sensor so that the angular rate of two axes can be detected. The angular rate detection element chips C5 and C6 are provided with a pad 307 on a main surface and are connected through the pad 307. The signal processing LSI chip C7 is provided with a pad 304 on a main surface and is connected through the pad 304.

In the inertial sensor illustrated in Embodiment 3, the signal processing LSI chip C7 is disposed on a sensor package unit 302 and the angular rate detection element chips C5 and C6 are mounted on the signal processing LSI chip C7. The signal processing LSI chip C7, and the acceleration detection element chips C5 and C6 are electrically connected through bonding wires W1 respectively provided between the pad 304 of the signal processing LSI chip C7 and the pad 307 of the angular rate detection element chips C5 and C6. In addition, the signal processing LSI chip C7 is electrically connected to an external electrode 303 by connection of the bonding wire W1 to an electrode 305 provided in the sensor package unit 302. In addition, a cap portion 301 is a lid of the sensor package unit 302 and constitutes a sensor module.

FIG. 12 is a configuration diagram illustrating an example of a configuration of the inertial sensor. The inertial sensor in Embodiment 3 includes angular rate detection elements 1200 and 1201 of portions of the angular rate detection element chips C5 and C6, and a detection circuit of a portion of the signal processing LSI chip C7. In the angular rate detection elements 1200 and 1201, 1200 is a roll angular rate detection element and 1201 is a pitch angular rate detection element. The angular rate detection elements 1200 and 1201 include drive electrodes 1200a and 1201a, monitor electrodes 1200b and 1201b, and detection electrodes 1200c and 1201c. The detection circuit includes CV conversion units 1202 and 1207, and ADC units 1203 and 1208, demodulation units 1204 and 1209, a frequency control unit 1205, an amplitude control unit 1206, and an LPF 1210. In addition, the detection circuit includes CV conversion units 1219 and 1223, ADC units 1220 and 1224, demodulation units 1221 and 1225, an amplitude control unit 1222, and an LPF 1226. Furthermore, the detection circuit includes an integration•angle calculation circuit 1211, a memory 1212, a digital communication circuit 1213, a common clock source 1214, frequency dividers 1215 and 1227, variable amplifiers 1216 and 1229, amplifiers 1217 and 1230, phase inverters 1218 and 1231, and a temperature sensor 1228.

Here, the roll angular rate detection element 1200 includes a drive electrode 1200a for mitigating the driving force causing vibration in the driving direction by an electrostatic force and a monitor electrode 1200b for reading vibration displacement in the driving direction as a change in the electrostatic capacity. On the other hand, the pitch angular rate detection element 1201 includes a drive electrode 1201a for mitigating the driving force causing vibration in the driving direction by an electrostatic force and a monitor electrode 1201b for reading vibration displacement in the driving direction as a change in the electrostatic capacity.

A frequency response of the two angular rate detection elements 1200 and 1201 will be described with reference to FIG. 13. FIG. 13 is a graph illustrating an example of a drive-side frequency response and a detection-side frequency response of the two angular rate detection elements. Here, f1 is a resonant frequency of the roll angular rate detection element 1200 in the driving direction, Q1 is a gain in the resonant frequency, f2 is a resonant frequency of the pitch angular rate detection element 1201 in the driving direction, Q2 is a gain in the resonant frequency, f3 is a resonant frequency of the roll and pitch angular rate detection elements 1200 and 1201 in the detection direction, and Q3 is a gain in the resonant frequency. Here, in FIG. 13, the detection-side frequency responses of the roll angular rate detection element 1200 and the pitch angular rate detection element 1201 are configured to coincide with each other, but it is not always necessary to coincide with each other.

Since f1 and f2 are separated from each other, in a case where the common clock source 1214 of the detection circuit is synchronized with the resonant frequency of the roll angular rate detection element 1200 in the driving direction, the gain of the pitch angular rate detection element 1201 in the driving direction is G2<Q2 in FIG. 13 while the driving direction of the roll angular rate detection element 1200 is G1=Q1 in FIG. 13. Therefore, the gain indicated by the mechanical quality factor by the original resonance cannot be fully used. However, with such a configuration, since one common clock source 1214 controls all the clocks of the signal processing LSI chip C7, it can contribute to simplification of the circuit configuration. For example, if the common clock source 1214 is configured to be synchronized with a detection axis having a narrow range (large scale factor), a range difference of voltage signal transition is reduced and restriction on circuit design can be further reduced.

The configuration of the circuit will be described with reference to FIG. 12 using the premise. The roll angular rate detection element 1200 includes a drive electrode 1200a for mitigating the driving force causing vibration in the driving direction by an electrostatic force and a monitor electrode 1200b for reading vibration displacement in the driving direction as a change in the electrostatic capacity. The clock generated by the common clock source 1214 is divided into an appropriate frequency by the frequency divider 1215 and a carrier signal converted into an appropriate voltage level through the amplifier 1217 is given to the movable portion of the roll angular rate detection element 1200. The electrostatic capacity configured by the monitor electrode 1200b changes due to a displacement of the movable portion of the roll angular rate detection element 1200. Therefore, an alternating current according to the electrostatic capacity configured by the monitor electrode 1200b to which the carrier signal is applied is generated.

The pitch angular rate detection element 1201 includes a drive electrode 1201a for mitigating the driving force causing vibration in the driving direction by an electrostatic force and a monitor electrode 1201b for reading vibration displacement in the driving direction as a change in the electrostatic capacity. The clock generated by the common clock source 1214 is divided into an appropriate frequency by the frequency divider 1227 and a carrier signal converted into an appropriate voltage level through the amplifier 1230 is given to the movable portion of the pitch angular rate detection element 1201. The electrostatic capacity configured by the monitor electrode 1201b changes due to a displacement of the movable portion of the pitch angular rate detection element 1201. Therefore, a change in the electrostatic capacity configured by the monitor electrode 1201b to which the carrier signal is applied, that is, an alternating current according to the displacement of the movable portion is generated.

Next, displacement information of the roll angular rate detection element 1200 indicated by the current causes a capacitor component to convert into a voltage through the roll drive-side CV conversion unit 1202 in the signal processing LSI chip C7, and a digital value is obtained through the roll drive-side ADC unit 1203. The signal converted into the digital region performs two processes of a demodulation process in which the demodulation is performed using a reference signal having the same frequency as that of the drive signal and a phase matched with the displacement signal and the displacement vibration amplitude component is extracted, and a demodulation process in which the demodulation is performed using the reference signal having the same frequency as that of the drive signal and a phase advanced by 90 degrees relative to the displacement signal, and a difference between the resonant frequency of the roll angular rate detection element 1200 in the driving direction and the drive frequency is extracted, in the roll drive-side demodulation unit 1204 of the digital signal region.

Similarly, displacement information of the pitch angular rate detection element 1201 indicated by the current causes a capacitor component to convert into a voltage through the pitch drive-side CV conversion unit 1219 in the signal processing LSI chip C7, and a digital value is obtained through the pitch drive-side ADC unit 1220. The signal converted into the digital region performs a demodulation in which the demodulation is performed using the reference signal having the same frequency as that of the drive signal and a phase matched with the displacement signal in the pitch drive-side demodulation unit 1221 of the digital signal region and the displacement vibration amplitude component is extracted. On the other hand, in the pitch angular rate detection element 1201 side, the demodulation process using the reference signal having the same frequency as that of the drive signal and a phase advanced by 90 degrees relative to the displacement signal is not performed.

The amplitude information obtained by the demodulation process is controlled so that the vibration of the roll•pitch angular rate detection elements 1200 and 1201 in the driving direction reaches a predetermined desired amplitude and a control output is used for gain adjustment of the variable amplifiers 1216 and 1229. Each of the drive signals is applied to one drive electrode directly and to the other electrode via the phase inverters 1218 and 1231, so that the drive signals undergoing the gain adjustment are in phase opposition to each other between facing electrodes in each of the roll•pitch angular rate detection elements 1200 and 1201. The roll•pitch angular rate detection elements 1200 and 1201 maintain vibration at a predetermined amplitude set in advance by the loop of control for maintaining the certain amplitude. On the other hand, a difference between the resonant frequency and the drive frequency of the roll angular rate detection element 1200 in the driving direction, obtained by the roll-side demodulation process is given to the roll frequency control unit 1205, the control output is given to the common clock source 1214, and a frequency control loop is configured so as to face a direction in which the difference between the resonant frequency and the drive frequency of the roll angular rate detection element 1200 in the driving direction is reduced.

The resonant frequency and the drive frequency of the roll angular rate detection element 1200 in the driving direction coincide with each other due to the above-described configuration. In addition, the clock of the digital unit D1 of the circuit is based on all the common clock sources 1214. The reference clock of the digital unit D1 is not required to be separately prepared and frequency stability using a high mechanical quality factor of the roll angular rate detection element 1200 is obtained by such a configuration Therefore, synchronizing the clock of the digital unit D1 with the resonant frequency of the roll angular rate detection element 1200 in the driving direction is advantageous from the viewpoint of simplification of the system configuration.

Next, a procedure for detecting the angular rate is the same as that of Embodiment 1. The roll•pitch angular rate detection elements 1200 and 1201 respectively include detection electrodes 1200c and 1201c for reading vibration displacement in the detection direction as a change in the electrostatic capacity. When the roll•pitch angular rate detection elements 1200 and 1201 vibrate in a predetermined driving direction, when the angular rate is applied, the Coriolis force is generated in the detection direction orthogonal to the drive vibration direction. The capacity of the detection electrodes 1200c and 1201c is changed by the displacement due to the Coriolis force. The change in the capacity is converted into a current by a carrier signal converted into an appropriate voltage level through the amplifiers 1217 and 1230, and is converted into a voltage by the detection-side CV conversion units 1207 and 1223, and is further converted into a digital value by the detection-side ADC units 1208 and 1224, and an amplitude of the vibration, that is, the angular rate in the detection direction is obtained by the detection-side demodulation units 1209 and 1225 which perform the demodulation at a phase matched with the vibration in the detection direction. The angular rate component obtained here drops unnecessary high frequency component via the LPFs 1210 and 1226, and is output as a signal S1 from the digital communication circuit 1213 to the host system.

Next, a circuit configuration relating to the integration of an output of the angular rate in Embodiment 3 will be described. Both the angular rate obtained from the roll angular rate detection element 1200 and the angular rate obtained from the pitch angular rate detection element 1201 are input into the integration•angle calculation circuit 1211. Here, in the integration•angle calculation circuit 1211, the memory 1212 is provided and the drive-side resonant frequency of the angular rate detection element being synchronized with the roll angular rate detection element 1200, that is, the common clock source 1214 measured in advance at a wafer level of prober inspection or the like and a value (as defined in Embodiment 1) according thereto, are stored.

The problem of the integration error due to the variation of the resonant frequency of the roll angular rate detection element 1200 in the driving direction is solved by employing such a configuration. It is possible to accurately calculate the roll angle and also for the pitch direction, it is possible to accurately calculate the pitch angle regardless of the variation of the drive-side resonant frequency of the pitch angular rate detection element 1201 and without storing the drive-side resonant frequency of the pitch angular rate detection element 1201 in the memory 1212. This is because sampling corresponding to the resonant frequency of the roll angular rate detection element 1200 in the driving direction is used and the clock of the digital unit D1 is common also in the pitch angle calculation. Even if the number of detection axes is increased by one as compared with Embodiment 1, the common clock source 1214, the memory 1212, and the integration•angle calculation circuit 1211 can be used in common. In addition, this is the same even if the detection axis is further increased.

Since correction by utilization of the temperature sensor 1228 is the same as that of Embodiment 1, the description thereof will be omitted.

Moreover, in Embodiment 3, modifications as illustrated in FIGS. 14 and 15 are also possible. FIG. 14 is a configuration diagram illustrating an example of a configuration of another inertial sensor. FIG. 15 is a graph illustrating an example of another drive-side frequency response and another detection-side frequency response of two angular rate detection elements. As illustrated in FIG. 14, in Embodiment 3, the demodulation is performed using the reference signal having the same frequency as that of the drive signal and a phase advanced by 90 degrees relative to the displacement signal by a demodulation unit 1403 in the angular rate detection element not synchronized with the common clock source 1214, that is, the pitch angular rate detection element 1201. Furthermore, in a case where control is performed in which a resonant frequency f2 of the pitch angular rate detection element 1201 in the driving direction is lowered by an electrostatic spring effect through a pitch frequency control unit 1401 and a variable DC voltage generation circuit 1402, and coincides with a resonant frequency f1 of the roll angular rate detection element 1200 in the driving direction, as illustrated in FIG. 15, the mechanical quality factor of the pitch angular rate detection element 1201 can be utilized. Therefore, the efficiency of the driving voltage versus sensitivity is optimized (G1=Q1=G2=Q2). In addition, because a dynamic range is equivalent, the dynamic range of the angle calculation that is calculated by the integration•angle calculation circuit 1211 is also equal for a plurality of axes.

As described above, in a case where the plurality of axes require the same dynamic range or even in a case where the same element is inclined by 90 degrees and used for multi-axis detection, the common clock source 1214, the memory 1212, and the integration•angle calculation circuit 1211 can be used in common and the circuit configuration can be simplified by adopting the configuration as illustrated in FIG. 14.

According to Embodiment 3 described above, it is possible to obtain the following different effects in addition to the same effects as those of Embodiment 1. For example, the inertial sensor includes the angular rate detection element chips C5 and C6 having the mechanical structure for detecting the angular rate of two axes, and the signal processing LSI chip C7 including the angular rate detection circuit for detecting the angle from the angular rate detection element chips C5 and C6. Therefore, the signal processing LSI chip C7 is synchronized with one drive frequency of the angular rate detection element chips C5 and C6. The drive frequency of the angular rate detection element chip C5 synchronized with the drive frequency or the value obtained from multiplication or division thereof is stored in advance in the memory 1212 that is a storage region and the angles of all the axes using the value stored in the memory 1212 can be calculated.

Embodiment 4

An inertial sensor in Embodiment 4 will be described with reference to FIGS. 16 to 18. In the following Embodiment 4, portions which are not mentioned in detail are the same as those in Embodiment 1. In Embodiment 4, an example of the inertial sensor that outputs the angular rate of further one axis to the outside in addition to the angular rate of one axis which is described above will be described. Particularly, here, it is assumed that the angular rate of roll and pitch is detected. Moreover, a mechanical structure for detecting the angular rate may be three axes or more.

FIG. 16 is a sectional view illustrating an example of a structure of the inertial sensor in Embodiment 4. In the inertial sensor in Embodiment 4, angular rate detection element chips C5 and C6, and two signal processing LSI chips C8 and C9 are provided in the sensor so that the angular rate of two axes can be detected. The angular rate detection element chips C5 and C6 are provided with a pad 307 on a main surface and are connected through the pad 307. The signal processing LSI chips C8 and C9 are provided with a pad 304 on a main surface and are connected through the pad 304.

In the inertial sensor illustrated in Embodiment 4, two signal processing LSI chips C8 and C9 are disposed on a sensor package unit 302 and the angular rate detection element chips C5 and C6 are mounted on the signal processing LSI chips C8 and C9. The signal processing LSI chips C8 and C9, and the angular rate detection element chips C5 and C6 are electrically connected through bonding wires W1 respectively provided between a pad 304 of the signal processing LSI chips C8 and C9, and a pad 307 of the angular rate detection element chips C5 and C6. In addition, the signal processing LSI chips C8 and C9 are electrically connected to an external electrode 303 by connection of the bonding wire W1 to an electrode 305 provided in the sensor package unit 302. In addition, a cap portion 301 is a lid of the sensor package unit 302 and constitutes a sensor module. In addition, the two signal processing LSI chips C8 and C9 are electrically connected by a wiring 1602 in the sensor package unit 302, and communicate with each other. However, regardless of the electrical connection method, the merit of the embodiment can be received.

FIG. 17 is a configuration diagram illustrating an example of a configuration of the inertial sensor. The inertial sensor in Embodiment 4 includes angular rate detection elements 401 of portions of the angular rate detection element chips C5 and C6, and detection circuits of portions of the signal processing LSI chips C8 and C9. The two angular rate detection element chips C5 and C6 are the same and the same reference numerals are given to the angular rate detection element and each electrode. In addition, the two signal processing LSI chips C8 and C9 are also the same and the same reference numeral is given to each unit. The two signal processing LSI chips C8 and C9 have basically the same configuration and, in Embodiment 4, are connected to a digital communication circuit 1713 of one signal processing LSI chip C8 via the wiring 1602 for communication. In addition, the resonant frequency of each of the angular rate detection elements 401 on the driving side or a value according thereto is recorded in memories 412 in the two signal processing LSI chips C8 and C9, and the integration calculation can be executed with high accuracy.

As in Embodiment 4, it is possible to notify the host system of a result of executing the integration calculation of angles of a plurality of axes with high accuracy by integrating a communication path to the host system in the digital communication circuit 1713 of one signal processing LSI chip C8 with smaller number of communication lines. In addition, in a case where the angles of the plurality of axes are output, an attitude of the final measurement object may be output by converting into a result obtained by a predetermined procedure such as "Euler's angle of ZXY" or "rotation matrix". Also in a case where such an output is performed, it is possible to deal with Embodiment 4 by providing an output calculation device in the digital communication circuit 1713 of one signal processing LSI chip C8.

In addition, the configuration can be integrated as a sensor module as illustrated in FIG. 18. FIG. 18 is a configuration diagram illustrating an example of a configuration of the sensor module. As illustrated in FIG. 18, inertial sensors 1801 and 1802 which detect the angular rate and output the angle of Embodiment 1 are integrated with a microcomputer 1803, and are integrated as a sensor module 1806 including a transceiver IC 1804, and may notify the host system of the angular rate and the angle through a communication method such as a CAN bus 1805.

In general, in a vehicle in which a driver's seat and a loading platform can be separated like a trailer (towing automobile), there is a delay or play in the transmission of kinetic energy between the driver's seat and the loading platform, so that the angular rate and acceleration to be detected are different depending on a mounting position of the sensor module. In such a case, it is desirable to mount the sensor to a position most sensitive to the inclination, such as a rear end of the loading platform. As long as the multi-axis angular calculation results can be collectively output as described above, even if the sensor is mounted on a position away from the control unit, it is possible to reduce the number of communication lines and communication amount and to obtain tolerance to bit errors.

According to Embodiment 4 described above, it is possible to obtain the following different effects in addition to the same effects as those of Embodiment 1. For example, the inertial sensor includes the angular rate detection element chips C5 and C6 having the mechanical structure for detecting the angular rate of two axes, and the signal processing LSI chips C8 and C9 including the angular rate detection circuit for detecting the angle from the angular rate detection element chips C5 and C6. Therefore, the signal processing LSI chips C8 and C9 calculate a value which is obtained from a calculation result of a plurality of angles and by which an attitude of the measurement object is uniquely obtained, and can output the calculated value.

Although the invention made by the present inventor has been concretely described based on the above-described embodiments, the present invention is not limited to the above-described embodiments, and it is needless to say that various modifications can be made within the scope not departing from the gist thereof.

For example, the present invention is advantageous in realizing inexpensive and highly accurate angles and attitude of the measurement object in an environment where the inertial force such as the centrifugal force exists. Further, in the failure diagnosis, since the probability of failure detection is high, it is also suitable for application requiring reliability such as automotive application.

Further, the above-described embodiments have been described in detail in order to explain the present invention in an easy to understand manner, and are not necessarily limited to those having all the configurations described. Further, a part of the configuration of one embodiment can be replaced by the configuration of another embodiment, and the configuration of another embodiment can be added to the configuration of one embodiment. Further, it is possible to add, delete, and replace other configurations with respect to a part of the configuration of each embodiment.

REFERENCE SIGNS LIST

C1, C5, C6 angular rate detection element chip
C2, C4, C7, C8, C9 signal processing LSI chip
C3 acceleration detection element chip
401, 1200, 1201 angular rate detection element
402, 407, 1202, 1207, 1219, 1223 CV conversion unit
403, 408, 1203, 1208, 1220, 1224 ADC unit
404, 409, 1204, 1209, 1221, 1225, 1403 demodulation unit
405, 1205, 1401 frequency control unit
406, 1206, 1222 amplitude control unit
410, 1210, 1226 LPF
411, 1211 integration•angle calculation circuit
412, 1212 memory
413, 1213 digital communication circuit
414, 1214 common clock source
415, 1215, 1227 frequency divider
416, 1216, 1229 variable amplifier
417, 1217, 1230 amplifier
418, 1218, 1231 phase inverter
419, 1228 temperature sensor
1000 integration•angle calculation•diagnosis circuit
1001a, 1001b acceleration detection element
1402 variable DC voltage generation circuit

The invention claimed is:

1. An inertial sensor comprising:
an angular rate detection element that has a mechanical structure configured to detect angular rate; and
an angular rate detection circuit configured to detect an angular rate from the angular rate detection element, wherein
the angular rate detection circuit is configured to calculate an angle by sampling a signal obtained from the angular rate detection element at a discrete time synchronized with a drive frequency of the angular rate detection element,
the signal obtained from the angular rate detection element by the angular rate detection circuit is an angular rate,
an operation clock of the angular rate detection circuit is synchronized with the drive frequency of the angular rate detection element,
a calculation in which the angular rate detection circuit calculates the angle is a time integration,
the drive frequency of the angular rate detection element is a resonant frequency of the angular rate detection element,
the drive frequency of the angular rate detection element or a value obtained from multiplication or division thereof is stored in advance in a storage region in the angular rate detection circuit, and
the angular rate detection circuit calculates the angle by using the drive frequency or the value stored in the storage region.

2. The inertial sensor according to claim 1, wherein an angular rate used for integration calculation by the angular rate detection circuit is a signal before passing through an LPF that outputs as the angular rate.

3. The inertial sensor according to claim 1, wherein in the integration calculation of the angular rate detection circuit, correction is performed by a temperature sensor.

4. The inertial sensor according to claim 1, wherein in the integration calculation of the angular rate detection circuit, an integration value is reset by an external resent signal.

5. The inertial sensor according to claim 1, wherein the integration calculation of the angular rate detection circuit detects that a movement of a measurement object does not occur or acceleration other than gravity is not applied to the measurement object, from an external signal indicating a motion state of the measurement object, and resets the integration value at a timing of the detection.

6. The inertial sensor according to claim 1, further comprising:
an acceleration detection element that has a mechanical structure for acceleration detection; and
an acceleration detection circuit for detecting an acceleration from the acceleration detection element,
wherein the acceleration detection circuit determines that at least one sensor has failed in a case where a difference between a result of an angle obtained from an inverse trigonometric function of the acceleration and a result of an angle obtained from a time integration of the angular rate exceeds a certain value.

7. The inertial sensor according to claim 1, further comprising:
a plurality of the angular rate detection elements that have a mechanical structure for detecting the angular rate of at least two axes or more; and
the angular rate detection circuit for detecting an angle from the plurality of angular rate detection elements,
wherein the angular rate detection circuit is synchronized with a drive frequency of the plurality of angular rate detection elements,
wherein the drive frequency of the angular rate detection element synchronized with the drive frequency or the value obtained from multiplication or division thereof is stored in advance in the storage region, and
wherein the angular rate detection circuit calculates angles of all axes using a value stored in the storage region.

8. The inertial sensor according to claim 1, further comprising:
a plurality of the angular rate detection elements that have a mechanical structure for detecting the angular rate of at least two axes or more; and
the angular rate detection circuit for detecting an angle from the plurality of angular rate detection elements,
wherein the angular rate detection circuit calculates a value which is obtained from a calculation result of a plurality of angles and by which a property of a measurement object is uniquely obtained, and outputs the calculated value.

9. The inertial sensor according to claim 1,
wherein the angular rate detection circuit has
a storage region that stores in advance the drive frequency of the angular rate detection element or the value obtained from multiplication or division thereof, and
a calculation circuit that calculates an angle by sampling a signal obtained from the angular rate detection element at the discrete time synchronized with the drive frequency of the angular rate detection element, and calculates the angle by using the value stored in the storage region when calculating the angle.

* * * * *